(12) United States Patent
Saito et al.

(10) Patent No.: US 8,480,314 B2
(45) Date of Patent: Jul. 9, 2013

(54) CONNECTION METHOD, CONNECTION TOOL, AND CONNECTION JIG FOR OPTICAL FIBER

(75) Inventors: Daigo Saito, Sakura (JP); Kazuhiro Takizawa, Sakura (JP); Hiroshi Furukawa, Sakura (JP); Serin Khee Yen Tan, Sakura (JP); Quang Minh Ngo, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/965,377

(22) Filed: Dec. 10, 2010

(65) Prior Publication Data

US 2011/0079930 A1 Apr. 7, 2011

Related U.S. Application Data

(63) Continuation of application No. PCT/JP2009/060612, filed on Jun. 10, 2009.

(30) Foreign Application Priority Data

Jun. 13, 2008 (JP) ................................. 2008-155993
Jun. 13, 2008 (JP) ................................. 2008-156024

(51) Int. Cl.
*G02B 6/255* (2006.01)

(52) U.S. Cl.
USPC .................... 385/98; 385/95; 385/97; 385/99; 65/407; 65/501

(58) Field of Classification Search
USPC ....................... 385/95, 97, 98, 99; 65/407, 501
See application file for complete search history.

(56) References Cited

U.S. PATENT DOCUMENTS 5,048,908 A * 9/1991 Blonder et al. ................. 385/39
5,787,216 A * 7/1998 Bice et al. ...................... 385/97

(Continued)

FOREIGN PATENT DOCUMENTS

JP 58152212 A 9/1983
JP 05-100117 A 4/1993

(Continued)

OTHER PUBLICATIONS

Notice of Reasons for Rejection issued Aug. 23, 2011 from the Japanese Patent Office in counterpart Japanese application No. 2007-319400.

(Continued)

*Primary Examiner* — Ryan Lepisto
(74) *Attorney, Agent, or Firm* — Sughrue Mion, PLLC

(57) ABSTRACT

A method of butting and connecting a first optical fiber and a second optical fiber in an optical connector comprises placing said optical connector that holds said first optical fiber in wherein an optical fiber connection tool; mounting said optical fiber holder on a holder mounting base of a front end bevel processing tool; processing a front end face of said second optical fiber such that said front end face of said second optical fiber is beveled relative to the surface perpendicular to the optical fiber axis direction; transferring said optical fiber holder to said holder support base; and moving said optical fiber holder toward said optical connector along said guide part, and butting and connecting the beveled front end face of said second optical fiber to the front end face of said first optical fiber such that their bevel directions are aligned.

16 Claims, 25 Drawing Sheets

U.S. PATENT DOCUMENTS

| | | | |
|---|---|---|---|
| 5,963,699 A | 10/1999 | Tanaka et al. | |
| 6,179,482 B1 | 1/2001 | Takizawa et al. | |
| 7,346,255 B2 | 3/2008 | Yamaguchi et al. | |
| 7,346,256 B2 * | 3/2008 | Marrs et al. | 385/137 |
| 7,934,874 B2 * | 5/2011 | Honma et al. | 385/97 |
| 2002/0064355 A1 * | 5/2002 | Ware et al. | 385/95 |
| 2003/0123836 A1 * | 7/2003 | Fujisawa et al. | 385/137 |
| 2005/0213897 A1 * | 9/2005 | Palmer et al. | 385/95 |
| 2007/0104445 A1 * | 5/2007 | Larson et al. | 385/134 |

FOREIGN PATENT DOCUMENTS

| | | |
|---|---|---|
| JP | 05-281433 | 10/1993 |
| JP | 10-319268 A | 12/1998 |
| JP | 2001013354 A | 1/2001 |
| JP | 2002-365473 | 12/2002 |
| JP | 3434668 B2 | 5/2003 |
| JP | 2005-134583 A | 5/2005 |
| JP | 2006-178289 A | 7/2006 |
| JP | 2007510941 | 4/2007 |
| JP | 2007121878 A | 5/2007 |
| JP | 2007156331 A | 6/2007 |
| JP | 2007333959 A | 12/2007 |
| JP | 2008292710 A | 12/2008 |
| JP | 2009145381 A | 7/2009 |
| WO | WO 2005052661 A1 | 6/2005 |

OTHER PUBLICATIONS

Japanese Office Action dated Apr. 23, 2013 issued in JP Patent Application No. 2008-155993.

Japanese Notice of Allowance dated Apr. 23, 2013 issued in JP Patent Application No. 2008-156024.

* cited by examiner

CONNECTION METHOD, CONNECTION TOOL, AND CONNECTION JIG FOR OPTICAL FIBER

CROSS-REFERENCE TO RELATED APPLICATION

This is a Continuation Application of International Application No. PCT/JP2009/060612, filed on Jun. 10, 2009, which claims priorities to Japanese Patent Application No. 2008-155993, filed Jun. 13, 2008, and Japanese Patent Application No. 2008-156024, filed Jun. 13, 2008. The contents of the aforementioned applications are incorporated herein by reference.

TECHNICAL FIELD

The present invention relates to a connection method, a connection tool, and a connection jig used therefore, in which the connection method is used for butting and connecting a pair of optical fibers to each other in a field assembly type optical connector or an optical connector comprising a mechanical splicing unit.

BACKGROUND ART

In an optical fiber connection, for example, in a field assembly type optical connector with a built in mechanical splice, or in a mechanical splicing unit, a method is used in which end part of a first optical fiber is butted and connected to a second optical fiber.

For the butt connection, an optical fiber connection tool is used (for example, refer to Patent Documents 1 and 2). The optical fiber connection tool comprises a support base that supporting the field assembly type optical connector in a fixed position, and an optical fiber holder that holds the optical fibers to be butted and connected. The butt connection can be performed, for example, by moving the optical fiber holder toward the field assembly type optical connector on the support base and inserting the front end parts of the optical fiber into a mechanical splice section of this optical connector.

On the other hand, as a technique for reducing the connection losses of optical fibers, there is a technique in which the front end faces of the optical fibers are beveled. If the front end faces are beveled, it is possible to reduce the reflected return light at the end faces (for example, refer to Patent Document 3).

[Patent Document 1] Japanese Unexamined Patent Application, First Publication No. 2005-134583
[Patent Document 2] Japanese Patent No. 3434668
[Patent Document 1] Japanese Unexamined Patent Application, First Publication No. H05-100117

However, in the case where optical fibers having their front end faces beveled are used, it is necessary to align the bevel directions, meaning the bevel angles and phases of the end faces of the two optical fibers accurately in order to reduce the reflected return light and have good connection characteristics. However, there is a problem in that the operation of adjusting these bevel directions is difficult.

SUMMARY

The present invention has been made in consideration of the above circumstances, with objects of providing an optical fiber connection method, a connection tool and a connection jig to be used therefore. The optical fiber connection method can align the bevel directions of the front end faces accurately when butting and connecting optical fibers having their front end faces beveled in an optical connector.

An optical fiber connection method of an embodiment of the present invention is a method of butting and connecting a first optical fiber and a second optical fiber in an optical connector, specifically, a method in which they are sandwiched between a pair of elements, and butted and connected to each other, said method comprises placing said optical connector that holds said first optical fiber in an optical fiber connection tool, said first optical fiber having a front end face beveled relative to a surface perpendicular to an optical fiber axis direction, said optical fiber connection tool comprising a holder support base that supports said optical connector thereon and an optical fiber holder that holds said second optical fiber therein, said holder support base having a guide part that guides said optical fiber holder in a direction approaching said optical connector; mounting said optical fiber holder on a holder mounting base of a front end bevel processing tool; processing a front end face of said second optical fiber such that said front end face of said second optical fiber is beveled relative to the surface perpendicular to the optical fiber axis direction; transferring said optical fiber holder to said holder support base; and moving said optical fiber holder toward said optical connector along said guide part, and butting and connecting the beveled front end face of said second optical fiber to the front end face of said first optical fiber such that their bevel directions are aligned.

The optical connector may be a field assembly type optical connector in which the first and the second optical fibers are sandwiched between a pair of elements and connected.

The optical connector may be a mechanical splicing unit in which the first and the second optical fibers are sandwiched between a pair of elements and connected.

An optical fiber connection tool of an embodiment of the present invention comprises a holder support base that supports an optical connector that holds a first optical fiber therein, said first optical fiber having a front end face beveled relative to a surface perpendicular to an optical fiber axis direction; an optical fiber holder that holds a second optical fiber therein; said holder support base comprising a guide part that guides said optical fiber holder in a direction approaching said optical connector; wherein said optical fiber holder can be mounted on a holder mounting base of a front end bevel processing tool, so that a front end face of said second optical fiber can be beveled relative to the surface perpendicular to the optical fiber axis direction; and said optical fiber holder can be moved toward said optical connector along said guide part on said holder support base, such that the beveled front end face of said second optical fiber, can be butted and connected to a front end face of said first optical fiber such that their bevel directions are aligned.

An optical fiber connection method of an embodiment of the present invention is a method of butting and connecting a first optical fiber and a second optical fiber in an optical connector, specifically, a method in which a first and a second optical fibers are sandwiched between a pair of elements, and butted and connected to each other, said method comprises supporting an optical connector that holds said first optical fiber therein on a holder support base, said first optical fiber having a front end face beveled relative to a surface perpendicular to an optical fiber axis direction; mounting an optical fiber holder that fixes said second optical fiber thereon, on a holder mounting base of a front end bevel processing tool; processing a front end face of said second optical fiber using said front end bevel processing tool such that a bevel angle and a phase match those of the front end face of said first optical fiber; transferring said optical fiber holder to said holder support base while said second optical fiber remains fixed; and butting and connecting the front end face of said second optical fiber to the front end face of said first optical fiber by moving said optical fiber holder toward said optical connector on said holder support base.

In the method of an embodiment of the present invention, said holder support base may have a guide part that guides said optical fiber holder in a direction approaching said optical connector.

In the method of an embodiment of the present invention, the phase of the front end face of the first optical fiber relative to a reference plane of the holder support base may be $\alpha 1$ ($0° \leq \alpha 1 < 180°$) while supporting the optical connector on the holder support base, and the front end face of the second optical fiber may be processed such that the front end face of the second optical fiber is beveled at the same angle as the front end face of the first optical fiber, and the phase relative to the reference plane of the optical fiber holder is $\alpha 1 + 180°$ while processing the front end face of the second optical fiber.

The reference plane of the holder support base may be an optical fiber holder support face of the holder support base, and the reference plane of the optical fiber holder may be a bottom face of the optical fiber holder.

An optical fiber connection method of an embodiment of the present invention is a method of butting and connecting a first optical fiber, with a front end face beveled relative to a surface perpendicular to an optical fiber axis direction, and a second optical fiber in an optical connector, said method comprises processing a front end face of said second optical fiber such that the end face is beveled relative to the surface perpendicular to the optical fiber axis direction using a front end bevel processing tool, while a connection jig is attached to said second optical fiber; and moving said second optical fiber toward said optical connector, and butting and connecting the front end face of said second optical fiber to the front end face of said first optical fiber such that their bevel directions are aligned, while said connection jig is orientated in a predetermined direction.

The connection jig can be attached and detached freely to and from the second optical fiber.

In the method of an embodiment of the present invention, the first and the second optical fibers can be sandwiched between a pair of holding elements in the optical connector and butt and connect them together.

The optical connector may have an optical ferrule.

The first optical fiber may be captive in the optical ferrule.

The connection jig of an embodiment of the present invention is a connection jig used for the above-described optical fiber connection method, and is a connection jig that can be attached to the second optical fiber.

When the connection jig of an embodiment of the present invention is attached to the second optical fiber, the connection jig may be not rotationally symmetrical about the axis.

A connection method of an embodiment of the present invention is a method of butting and connecting a first optical fiber, with a front end face beveled relative to a surface perpendicular to an optical fiber axis direction, and a second optical fiber in an optical connector, said method comprises fixing said optical connector a first position; processing a front end face of said second optical fiber such that said end face is beveled relative to the surface perpendicular to the optical fiber axis direction aligned with a bevel angle of said first optical fiber; moving said second optical fiber toward said optical connector while maintaining the bevel direction of said second optical fiber such that the front end face of said second optical fiber and the front end face of said first optical fiber match; and connecting said first optical fiber and second optical fiber such that the bevel direction of the front end face of said second optical fiber and the bevel direction of the front end face of said first optical fiber match.

In the method of an embodiment of the present invention, the bevel angle of the front end face of the first optical fiber and the bevel angle of the second optical fiber may be the same, an phase of the front end face of the optical connector fixed in the first position may be set to $\alpha 1$ ($0° \leq \alpha 1 < 180°$) relative to a first reference plane of the first position, and the front end face of the second optical fiber is beveled such that the phase relative to the first reference plane is $\alpha 1 + 180°$.

The method of an embodiment of the present invention is an optical fiber connection method in which the optical connector can sandwich the front end faces of the first and the second optical fibers between a pair of holding elements and butts them to each other, a spacer tube covers the second optical fiber, and the pair of holding parts clamps the second optical fiber via the spacer tube.

The optical connector may sandwich the front end faces of the first and the second optical fibers between a pair of holding elements, and butts them to each other, and a spacer tube may cover the second optical fiber, and the pair of holding parts clamps the second optical fiber via the spacer tube.

The embodiments of the present invention can be used for an optical connector having the following construction.

That is, an optical connector that can be assembled at the front end of a first optical fiber and a second optical fiber with a smaller diameter than that of the first optical fiber, the optical connector has an optical ferrule and a holding part provided on the rear end side of the optical ferrule, wherein the holding part has holding elements that can sandwich and fix the jacket of the first optical fiber, and the holding elements can sandwich and fix the second optical fiber via a spacer tube covering at least part of the second optical fiber.

An optical connector in which the holding part can sandwich the spacer tube or the jacket between the holding elements by the elasticity of a spring.

An optical connector in which the outer diameter of the first optical fiber is 0.9 mm, and the outer diameter of the second optical fiber is 0.25 mm.

An optical connector in which a protective tube into which the second optical fiber inserted into the spacer tube is inserted can be installed at the rear end of the spacer tube, and the inner diameter of the protective tube is greater than the outer diameter of the second optical fiber.

The following method can be used in order to assemble the above-described connectors.

A method of assembling an optical connector, which is a method for assembling a second optical fiber whose diameter is smaller than the first optical fiber, in an optical connector that can be assembled at the front end of the first optical fiber, wherein the optical connector has an optical ferrule and a holding part provided on the rear end side of the optical ferrule, the holding part has holding elements that can sandwich and fix the jacket of the first optical fiber, a spacer tube covers at least part of the second optical fiber, the second optical fiber is inserted into the optical connector to connect it to the optical fiber in the optical connector, the second optical fiber is sandwiched by the holding elements via the spacer tube, and the second optical fiber is fixed in the holding part.

EFFECTS OF THE INVENTION

According to the embodiments of the present invention, it is possible to accurately align the bevel direction of the front end face of the second optical fiber (the other optical fiber), which is beveled, with the bevel direction of the front end face of the first optical fiber (one optical fiber), which is fixed in the optical connector. As a result, it is possible to reduce the reflections at the connection part, so that a connection with low loss can be realized.

Furthermore, at the time of the connection operation, it is easy to confirm the bevel direction of the front end face of the second optical fiber, and also it is not necessary to perform the adjustments for the bevel direction, so that manipulation is easy.

Therefore, the operation for assembling the optical connector at the front end of the second optical fiber in the field is simplified. Moreover, it is possible to connect optical fibers with different thicknesses without changing the structure of the optical connector.

BRIEF DESCRIPTION OF THE REFERENCE SYMBOLS

1 Ferrule (Optical Ferrule)
2 Holding part
8 Housing
10 Optical Connector
11 Captive (Built-in) Optical Fiber (First Optical Fiber; One Optical Fiber)
11A Rear End Face (Front End Face)
12a Base Part (Base Part side Holding Element)
12c Lid (Lid Side Holding Element)
13 Clamp Spring
18 Optical Fiber (Second Optical Fiber; The other Optical Fiber)
18a Front End Part
18b, 18c Jacket
18A, 18B Optical Fiber (Optical Fiber Core Wire)
18C Optical Fiber (Optical Fiber Cord)
18D Front End Face
19 Spacer Tube
22 Fixing Part
25 Screw Part
27 Protective Tube
32 Tensile Elements
60 Marking member (Connection Jig)
71 Optical Fiber Connection Tool
73 Clamp Part
73A, 73B Elements
80 Optical Connector
90 Optical Fiber Holder
100 Holder Support Base
103 Rail Part (Guide Part)

110 Front End Bevel Processing Tool
111 Holder Mounting Base
112 Processing Device
130 Optical Fiber (First Optical Fiber; One Optical Fiber)
F Inserted Optical Fiber (Second Optical Fiber; The Other Optical Fiber)
F1 Bare Optical Fiber
F2 Optical Fiber
F3 Front End Face
G Internal Optical Fiber (First Optical Fiber; One Optical Fiber)
G1 Rear End Face (Front End Face)

BEST MODE FOR CARRYING OUT THE INVENTION

Hereunder is a description of a first embodiment of the present invention with reference to the drawings.

Figure 1:
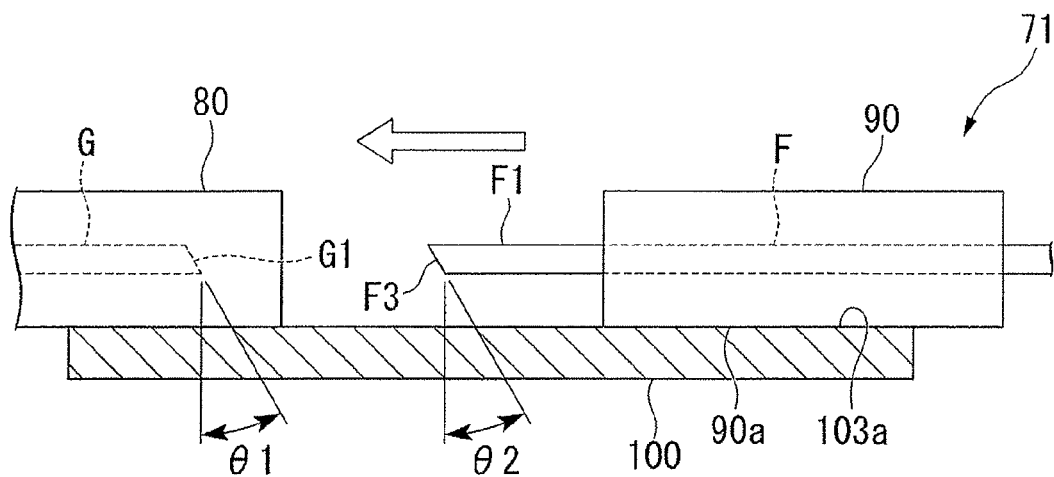
FIG. 1 is a schematic structural view showing an example of an optical fiber connection tool.
Figure 2:
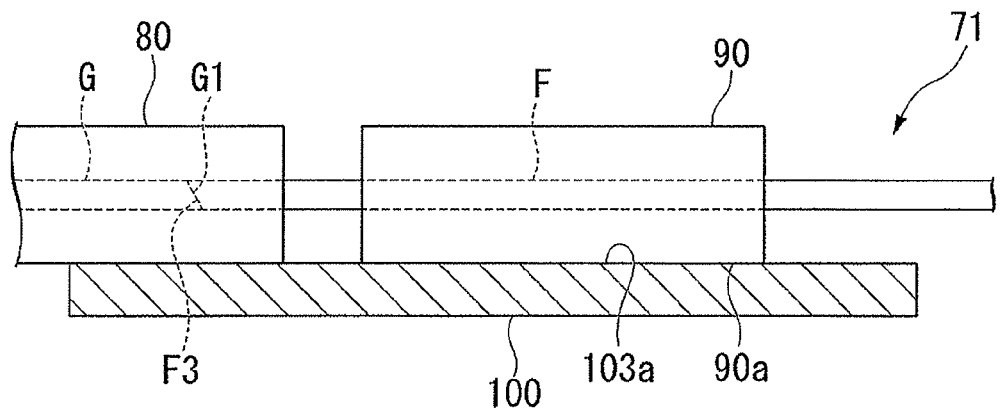
FIG. 2 is a schematic structural view showing an example of an optical fiber connection tool.
Figure 3:
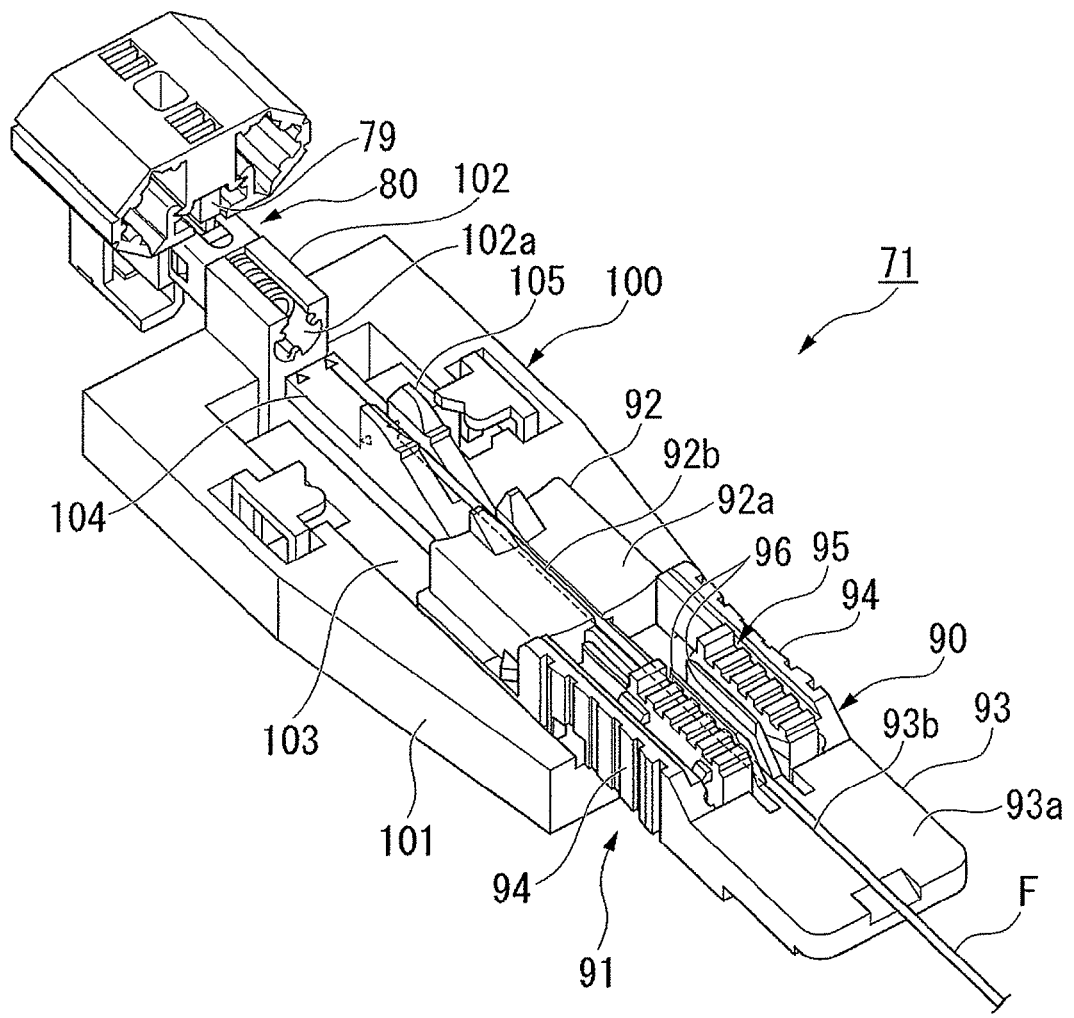
FIG. 3 is a perspective view showing an optical fiber connection tool.
Figure 4:
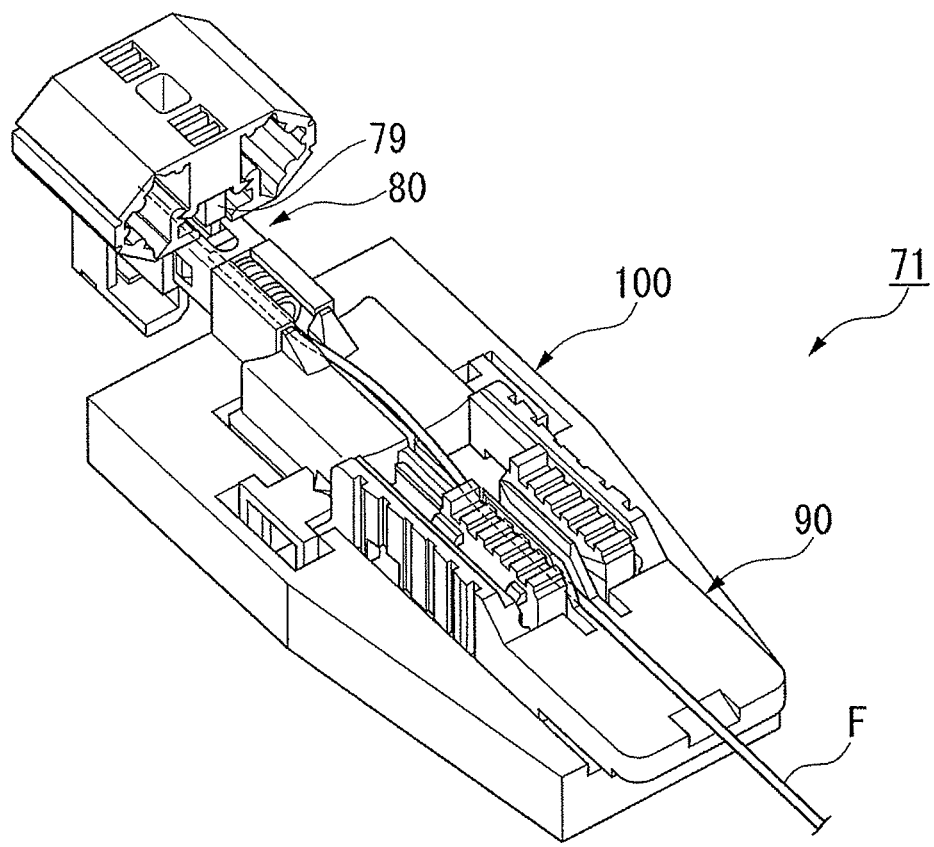
FIG. 4 is a perspective view showing an optical fiber connection tool.
Figure 5:
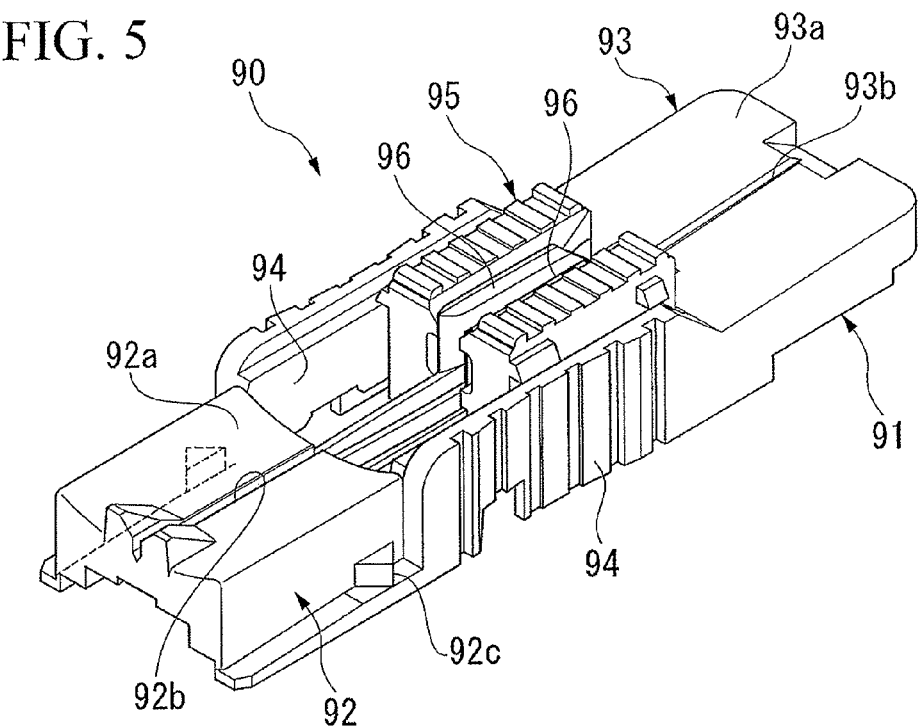
FIG. 5 is a perspective view showing an optical fiber holder.
Figure 6:
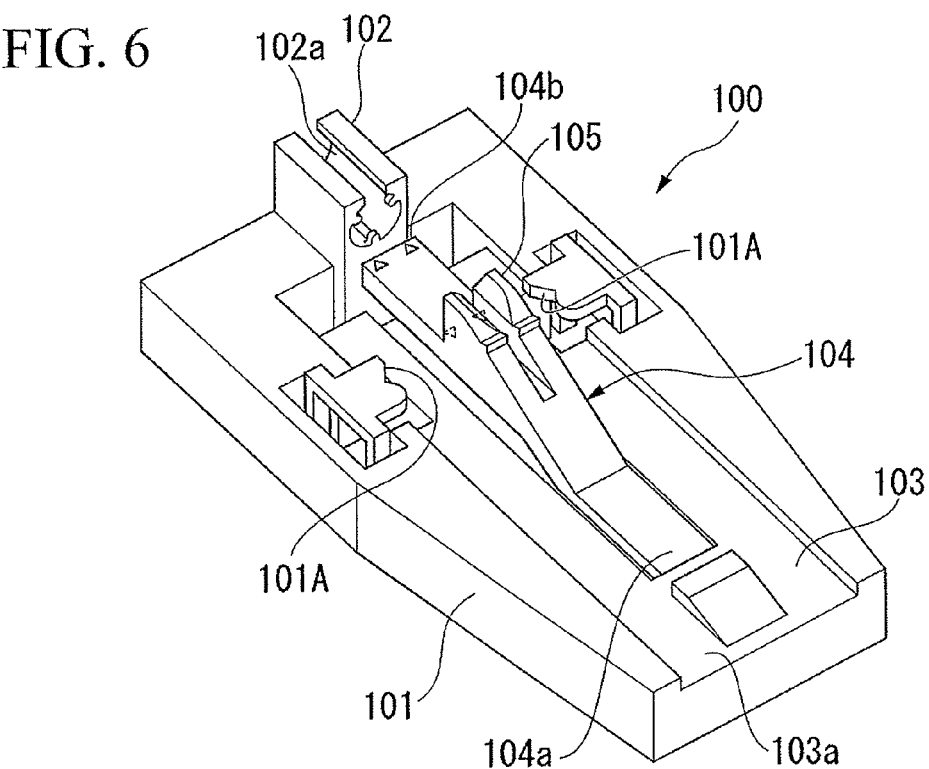
FIG. 6 is a perspective view showing a holder support base.
Figure 7:
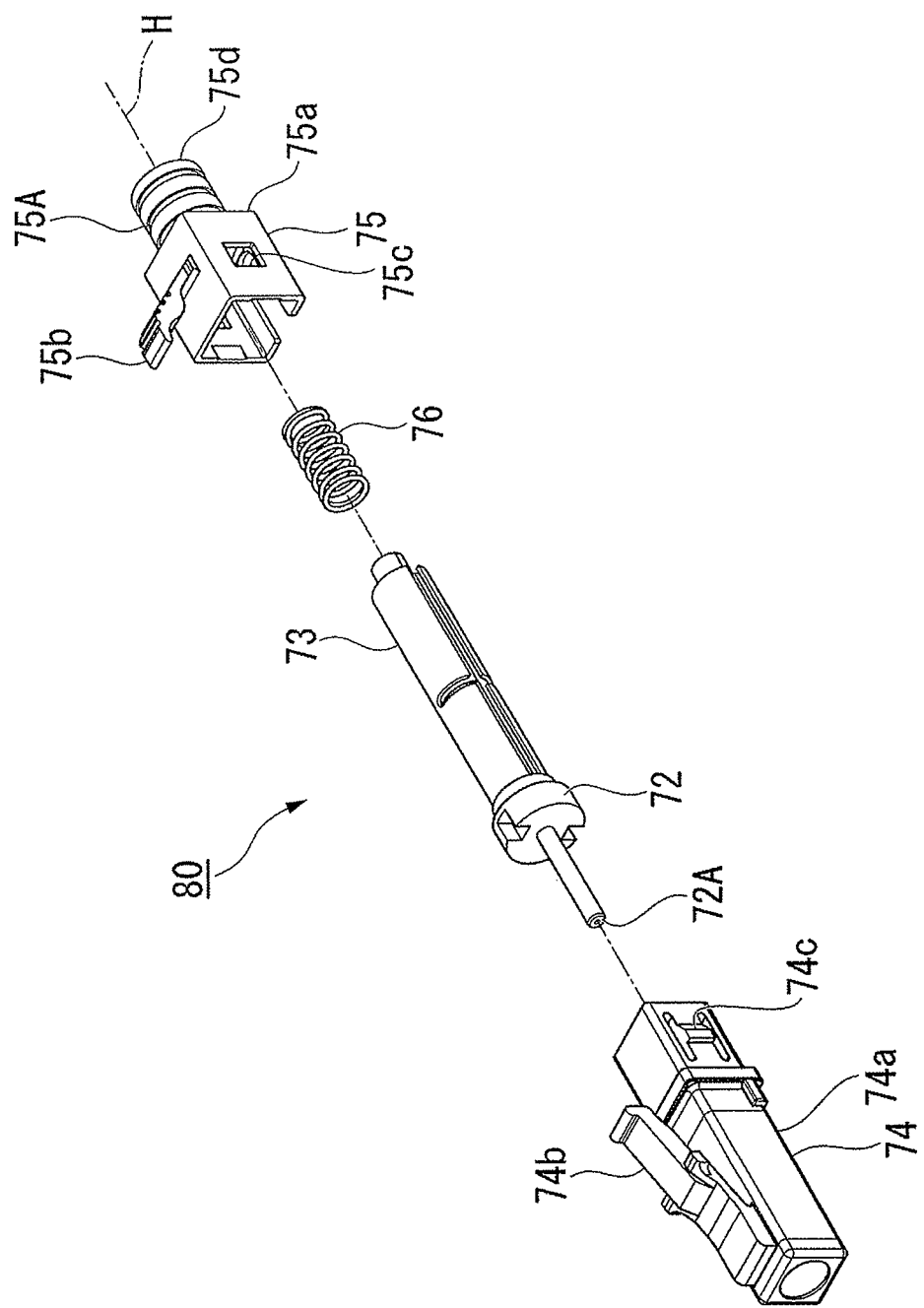
FIG. 7 is an exploded perspective view of the main parts of an optical connector that can be used in the optical fiber connection method of the present invention.
Figure 8:
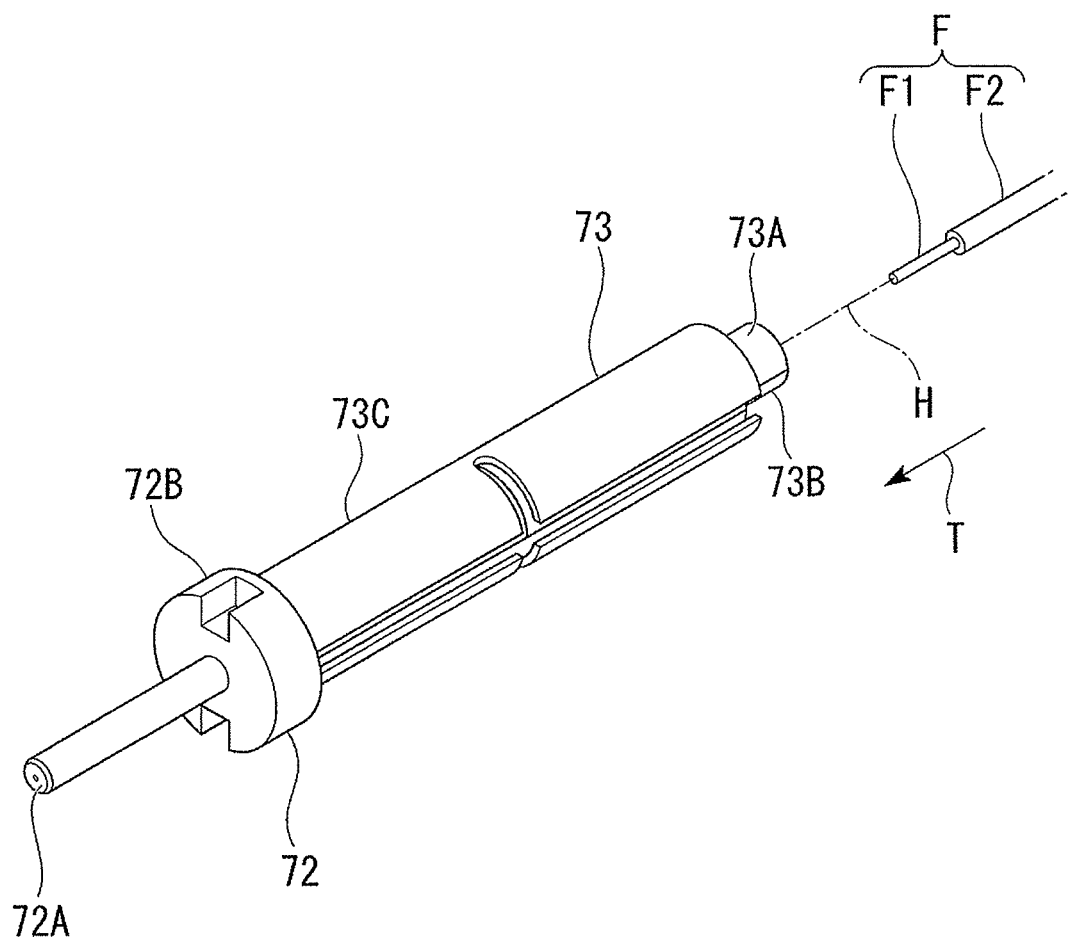
FIG. 8 is a perspective view showing a clamp part of the optical connector.
Figure 9A:
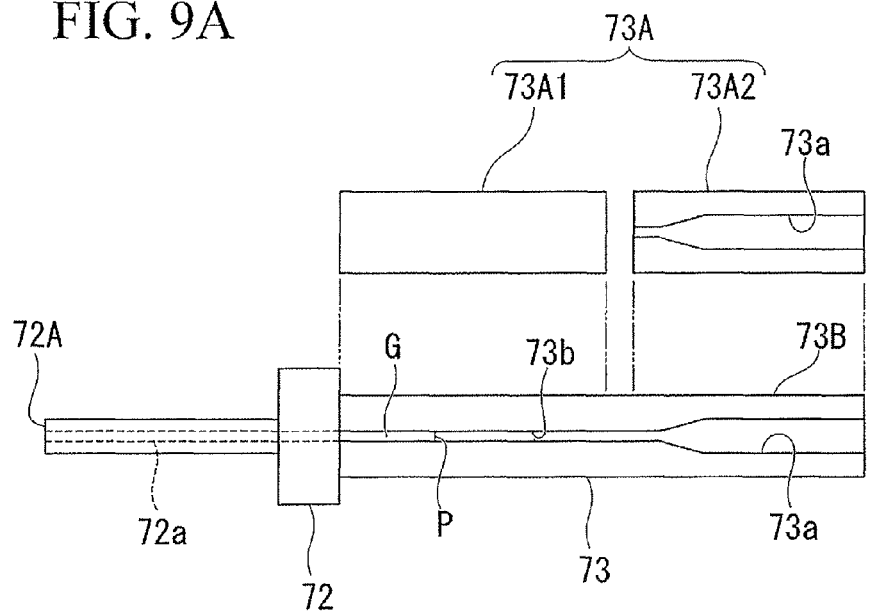
FIG. 9A is an exploded side view showing the clamp part of the optical connector.
Figure 9B:
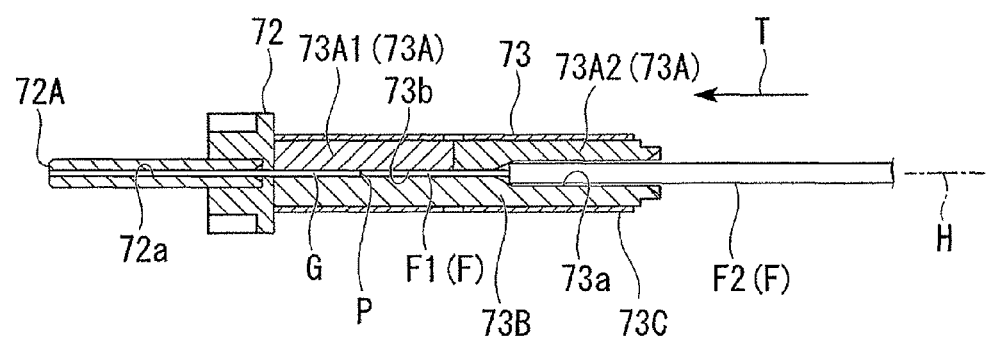
FIG. 9B is a cross-sectional view showing the clamp part shown in the previous figure.

FIG. 1 and FIG. 2 are schematic structural views showing an optical fiber connection tool 71, which is an example of an optical fiber connection tool of the present invention. FIG. 3 and FIG. 4 are perspective views showing the optical fiber connection tool 71. FIG. 5 is a perspective view showing an optical fiber holder 90 of the optical fiber connection tool 71. FIG. 6 is a perspective view showing a holder support base 100 of the optical fiber connection tool 71. FIG. 7 is an exploded perspective view of the main parts of an optical connector 80 that is used for an example of an optical fiber connection method of the present invention. FIG. 8 is a perspective view showing a clamp part. FIG. 9A is an exploded side view showing the clamp part. FIG. 9B is a horizontal direction cross-sectional view showing the clamp part.

As shown in FIG. 1, the optical fiber connection tool 71 is one that butts and connects an inserted optical fiber F (second optical fiber; the other optical fiber) to an internal optical fiber G (first optical fiber; one optical fiber) in the optical connector 80. The optical fiber connection tool 71 comprises an optical fiber holder 90 for holding the inserted optical fiber F, and a holder support base 100 for guiding the optical fiber holder 90 as it approaches the optical connector 80.

For the internal optical fiber G and the inserted optical fiber F, a quartz single mode type optical fiber or a multi mode type optical fiber can be used. The types of optical fiber that can be used are common to all of the embodiments of the present invention. In the following description, the front end direction and forward are the front end direction of the ferrule 72, and backward is the direction opposite to the front end direction (refer to FIG. 5 to FIG. 9B). In FIG. 5 to FIG. 9B, the insertion direction of the inserted optical fiber F that is inserted into the optical connector 80 is designated with reference symbol T, and the axis is designated with reference symbol H.

Firstly, the structure of the optical connector 80 will be described based on the figures.

As shown in FIG. 7 and FIG. 8, the optical connector 80 is a field assembly type optical connector, and comprises a clamp part 73 which butts, connects, and holds the inserted optical fiber F and the internal optical fiber G that is inserted and fixed inside of the ferrule 72.

The construction of the optical connector 80 is such that the ferrule 72 fitted in the clamp part 73 and a spring 76 are housed in a housing which comprising a sleeve shaped plug frame 74 and a cap shaped stop ring 75 which is fitted to the rear end of the plug frame 74.

The ferrule 72 is inserted in a frame body 74a of the plug frame 74 from the aperture at its rear end. The ferrule 72 is urged forward by the spring 76.

The plug frame 74 comprises a sleeve shaped frame body 74a and a spring piece 74b rising diagonally from a side face of the front end part of the frame body 74a toward the rear side thereof.

The stop ring 75 comprises a sleeve shaped stop ring body 75a and a spring piece 75b rising diagonally toward the plug frame 74 (frame body 74a) which is fitted in the stop ring body 75a from the side part (lateral part) of the stop ring body 75a.

A cylindrical fitting part 75A, which forms an optical fiber insertion hole 75d, is provided at the rear end of the stop ring 75 such that the axis of hole of the cylindrical fitting part 75A is coaxial with the insertion axis of the inserted optical fiber F.

By fitting the stop ring body 75a of the stop ring 75 at the rear end of the frame body 74a of the plug frame 74, and by engaging locking hooks 74c in locking windows 75c of the stop ring body 75a, the stop ring 75 is locked (latched) on the rear end of the plug frame 74 and integrated with it. The locking hooks is provided and protruded on the two sides of the rear end part of the frame body 74a.

As shown in FIG. 9A and FIG. 9B, for the ferrule 72, an SC type ferrule or an MU type ferrule is used, which is formed from a hard material such as a ceramic like zirconia, or glass. A narrow aperture 72a is provided at the ferrule 72 along axis direction thereof. The narrow aperture 72a is formed such that it is located coaxially with the axis H of the above-mentioned inserted optical fiber F.

The front end face of the ferrule 72 is a connecting end face 72A which connects with the ferrule of the other optical connector, and is exposed on the front end side of the optical connector 80.

As shown in FIG. 8, FIG. 9A, and FIG. 9B, in the clamp part 73, an element 73A (lid) split into halves, and an element 73B (base) are covered by a metal spring 73C with a C-shaped (or U-shaped) cross-section, and fastened firmly (clamped). The clamp part 73 is a mechanical splice part which can sandwich and fix an optical fiber between the elements 73A and 73B.

A ferrule flange 72B is provided on the rear end side of the ferrule. The base 73B is provided in the ferrule flange 72B. The ferrule flange 72B and the base 73B are formed in one piece from resin.

The element 73A is divided into a front and a rear along the axis direction of the inserted optical fiber F, the part on the ferrule 72 side being designated an element 73A1, and that on the rear end side being designated an element 73A2. An inner groove 73a with a large diameter, which extends along the axis in the insertion direction that the inserted optical fiber F is inserted, is formed in the mating face of the element 73A (73A2). An inner groove 73a with a large diameter and an inner groove 73b with a small diameter, which extend along the axis in the insertion direction that the inserted optical fiber F is inserted, are formed in the mating face of the other element 73B.

The present embodiment is described in detail in the specification of U.S. Pat. No. 6,179,482 (OPTICAL CONNECTOR AND HOUSING FOR OPTICAL CONNECTOR).

An internal optical fiber G is inserted between the elements 73A and 73B. The internal optical fiber G is inserted in the narrow aperture 72a of the ferrule 72, and its front end is exposed at the connecting end face 72A. The internal optical fiber G is adhered in the narrow aperture 72a.

The rear end of the internal optical fiber G reaches the inner groove 73b of the elements 73A and 73B. The internal optical fiber G is a bare optical fiber, for example.

As shown in FIG. 1 and FIG. 2, the rear end face G1 (front end face) of the internal optical fiber G is beveled relative to the surface perpendicular to the axis direction of the internal optical fiber G. The bevel angle θ1 may be 7 to 9 degrees, or more particularly may be approximately 8 degrees.

The inserted optical fiber F is an optical fiber (denoted by reference symbol F2 in FIG. 6 to FIG. 9B) in which a resin covering is provided on the outer periphery of a bare optical fiber (denoted reference number F1), for example. At the front end part of the inserted optical fiber F, the resin covering is removed for the purpose of the connection operation, so the bare optical fiber F1 is exposed.

The front end face F3 of the bare optical fiber F1 of the front end part of the inserted optical fiber F is beveled relative to the surface perpendicular to the axis direction of the inserted optical fiber F.

The bevel direction of the front end face F3 is set to align with the bevel direction of the rear end face G1, so that it can be butted and connected to the rear end face G1 of the internal optical fiber G. That is, the bevel angle θ2 of the front end face F3 is made almost equal to the bevel angle θ1 of the rear end face G1, and the phase of the front end face F3 coincides with the phase (which is also called the phase angle) of the rear end face G1. Here coinciding means that there is no gap. By so doing, it is possible to butt and connect the front end face F3 to the rear end face G1 with no gap.

The bevel angle θ2 of the front end face F3 may be, to be specific, 7 to 9 degrees, and more particularly may be approximately 8 degrees.

Reference symbol P in FIG. 9B denotes the point at which the inserted optical fiber F and the internal optical fiber G are butted and connected.

The region of the connection of the inserted optical fiber F and the internal optical fiber G can be filled with a refractive index matching agent such as silicone grease (a refractive index matching agent can be used similarly in the following embodiments). The present invention asserts that the front end faces are matched not only in the case where the front end faces are aligned perfectly, but also in the case where there is a slight gap created. The size of gap permitted depends on the design parameters of an optical wiring system in which the optical connector is used.

Next is a description of an apparatus for connecting the inserted optical fiber F to the optical connector.

As shown in FIG. 3, FIG. 5, and FIG. 6, the inserted optical fiber F is held by the optical fiber holder 90. The optical connector 80 is fixed in the top of the holder support base 100.

The optical fiber holder 90 can slide along freely with respect to the holder support base 100.

The optical fiber holder 90 that holds the inserted optical fiber F comprises a base 91, and a clamp member 95 provided on the base 91.

The base 91 has a pair of front and back optical fiber mounting parts 92 and 93, and a pair of side wall parts 94 which join the optical fiber mounting parts 92 and 93. The clamp member 95 fitted inside of the base 91 can slide along freely between the pair of front and back optical fiber mounting parts 92 and 93. The sliding direction is along the direction of the inserted optical fiber F.

V grooves 92b and 93b in which the inserted optical fiber F is accommodated are formed in the top surfaces 92a and 93a of the optical fiber mounting parts 92 and 93.

A pair of spring pieces 96 for sandwiching and holding the inserted optical fiber F is provided in the clamp member 95. Recessed and protruded portions are formed on the surfaces of the spring pieces 96 so that they can be manipulated easily.

If the pair of spring pieces 96 is slid toward one side, the space between the pair of spring pieces 96 expands. In this position, the inserted optical fiber F is inserted between the pair of spring pieces 96. Next, if the pair of spring pieces 96 is slid toward the other side, the space between the pair of spring pieces 96 becomes narrow, and the inserted optical fiber F is sandwiched and fixed such that it does not move. By the above operation, the inserted optical fiber F is fixed in the optical fiber holder 90.

The optical fiber holder 90 can be attached and removed freely with respect to the holder support base 100.

Hereunder, the underside surface 90a (bottom surface) of the optical fiber holder 90 is sometimes designated a holder reference plane (refer to FIG. 1).

The holder support base 100 has a base 101, and an optical connector support part 102, which is provided on the front end side of the base 101, and fixes the optical connector 80.

The holder support base 100 is formed in one piece from resin.

On the top surface of the base 101 there is formed a rail part 103 (guide part) provided such that it can slide along so as to guide the optical fiber holder 90 so as to connect it to the optical connector 80.

A hole 102a, in which the stop ring 75 (fitting part 75A) of the optical connector 80 is fitted, is formed in the optical connector support part 102.

The rail part 103 guides the optical fiber holder 90 as it slides toward the front end side from the rear end side, and is formed on the top surface of the holder support base 100 in a linear groove shape. The width of the rail part 103 is almost the same as or slightly greater than the width of the optical fiber holder 90 and the optical fiber holder 90 is formed such that it can slide along without changing its attitude.

The inner surface 103a (bottom surface) of the rail part 103 shown in FIG. 6 is an optical fiber holder support surface for supporting the optical fiber holder 90. Hereunder, it is sometimes denoted a support base reference plane (refer to FIG. 1).

An optical fiber mounting platform 104, on which the front end part of the inserted optical fiber F held by the optical fiber holder 100 is mounted, is formed on the inner surface 103a of the rail part 103. The optical fiber mounting platform 104 can rotate in a direction by which the front end part 104b on the optical connector side moves up and down with rear anchor part 104a being its pivot point. A pair of guide protrusions 105 for preventing the inserted optical fiber F from falling out is formed at the front end of the optical fiber mounting platform 104.

The guide protrusions 105 are constructed as two blades facing each other. The inserted optical fiber F is guided toward the optical connector by the guide protrusions 105. The distance between the guide protrusions 105 is approximately the diameter of the jacket (outer diameter) of the inserted optical fiber F sandwiched between the two blades.

Next is a description of a method of connecting optical fibers in the optical connector 80.

The front end face of the internal optical fiber G is beveled in advance before installing the optical connector.

The optical connector 80 is fixed in the optical connector support part 102 such that the phase of the rear end face G1 of the internal optical fiber G, which is beveled, becomes α1 ($0° \leq α1 < 180°$) relative to the inner surface 103a (support base reference plane) of the holder support base 100. Here α1 is arbitrary, provided it is greater than or equal to 0°, and less than 180°. Phase means the angle of a line passing through the center of the end face of the optical fiber in the direction of rotation of its axial with respect to a reference plane, for example.

Furthermore, the bevel direction means the concept which includes the bevel angle and phase sometimes.

Matching bevel directions means that the bevel angle and the phase are coincident.

It is possible to determine the bevel direction of the internal optical fiber G with respect to the support base reference plane by the mounting construction of the optical connector 80 and the optical connector support part 102.

In the optical connector 80, an insert member 79 (refer to FIG. 11A) is break into between the pair of elements 73A and 73B in order to expand the space between the elements 73A and 73B.

In order to form the front end face F3 of the inserted optical fiber F, the following method may be used, for example.

Figure 10A:
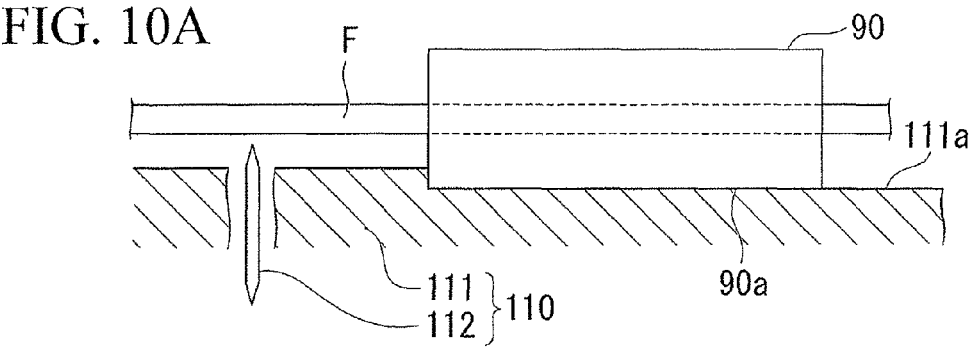
FIG. 10A is a process drawing showing an example of a method for processing the front end face of an optical fiber surface held in the optical fiber holder of the optical fiber connection tool using a front end bevel processing tool.

As shown in FIG. 10A, the inserted optical fiber F is held by the optical fiber holder 90.

To be specific, as shown in FIG. 5, the inserted optical fiber F is housed in the V grooves 92b and 93b, and also held by the clamp member 95, being sandwiched by the spring pieces 96.

The front end bevel processing tool 110 has a holder mounting base 111 on which the optical fiber holder 90 can be mounted, and a processing device 112 (cutter) for processing the front end of the inserted optical fiber F held by the optical fiber holder 90 on the holder mounting base 111.

The optical fiber holder 90 is mounted on the holder mounting base 111 in a state in which the underside surface 90a (holder reference plane) is directed toward the top surface 111a of the holder mounting base 111.

Figure 10B:
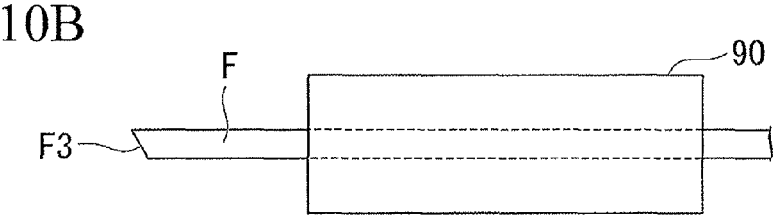
FIG. 10B is the process drawing following the previous drawing.

As shown in FIG. 10B, the front end of the inserted optical fiber F is processed, in a state in which the inserted optical fiber F is held by the optical fiber holder 90, by the processing device 112 to form a beveled front end face F3.

The bevel direction of the front end face F3 is set such that when the optical fiber holder 90 is placed on the holder support base 100, it lies in the bevel direction of the rear end face G1 of the internal optical fiber G of the optical connector 80 supported by the optical connector support part 102 (refer to FIG. 1).

For example, the front end face F3 can be processed such that it is beveled at the same angle as that of the rear end face G1 of the internal optical fiber G, and the phase relative to the underside surface 90a (holder reference plane) of the optical fiber holder 90 is α1+180°.

By so doing, the phase of the front end face F3 of the inserted optical fiber F almost aligns with the phase of the rear end face G1 when butting the inserted optical fiber F and the internal optical fiber G, which is described later.

In the figure, the processing device 112 (cutter) is perpendicular to the optical axis of the optical fiber. However, as is well known, if an optical fiber is twisted along the rotation direction of the axis, the cutting plane can be inclined. The bevel angle can be set appropriately by the twist angle. Since a finishing device (also called a cleaver) having a mechanism for twisting the optical fiber is well known, the detailed mechanism is omitted.

For a front end bevel processing tool, an Angled Fiber Optic Cleaver "MAX CI-08" from Ilsintech Co., Ltd. can be used, for example.

Figure 10C:
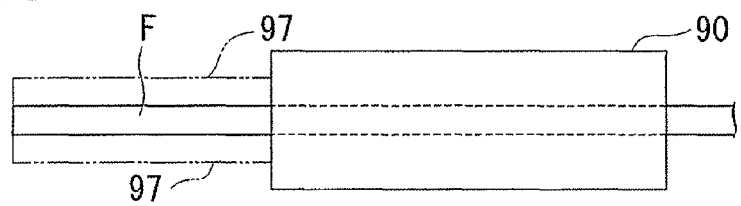
FIG. 10C is a process drawing showing another example of a method for processing the front end face of the optical fiber held in the optical fiber holder of the optical fiber connection tool using a front end bevel processing tool.
Figure 10D:
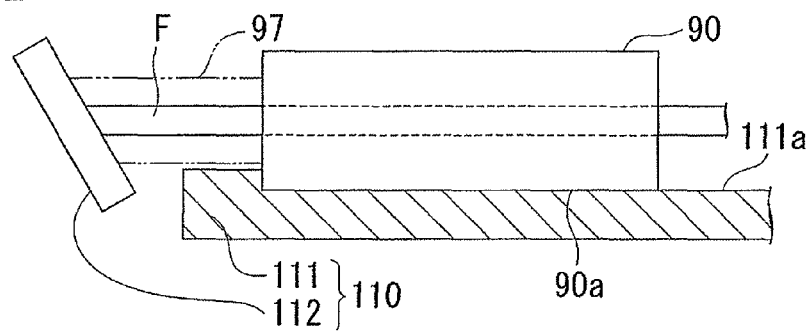
FIG. 10D is the process drawing following the previous drawing.

As shown in FIG. 10C and FIG. 10D, when forming the front end face F3, it is also possible to process the front end face F3 by using the processing device 112 (grinding plate). At this time, it is also possible to fix the parts including the front end of the inserted optical fiber F to the optical fiber holder 90 using a fastening member 97 such as an adhesive or a clamp member. The fastening member 97 is removed after the front end face F3 is formed.

As shown in FIG. 1 and FIG. 2, the optical fiber holder 90 in which the inserted optical fiber F is held, is transferred to the holder support base 100 of the optical fiber connection tool 71 at this state (with the inserted optical fiber F fixed and held).

At this time, the arrangement is such that the underside surface 90a (holder reference plane) of the optical fiber holder 90 is directed toward the inner surface 103a (support base reference plane) of the holder support base 100. That is, the optical fiber holder 90 is mounted on the holder support base 100 in the same attitude as when processing the front end in the front end bevel processing tool 110.

To be specific, as shown in FIG. 3 and FIG. 4, the optical fiber holder 90 is located in the rail part 103 in a state in which the underside surface 90a (holder reference plane) is directed toward the inner surface 103a (support base reference plane). At this time, it is arranged such that the inserted optical fiber F is placed between the guide protrusions 105 of the optical fiber mounting platform 104 so that it does not move.

The optical fiber holder 90 is slid along the rail part 103 toward the optical connector 80 supported by the optical connector support part 102.

When the optical fiber holder 90 is slid, the optical fiber holder 90 and the base 101 are fixed by locking protrusions 92c on the side faces of the optical fiber holder 90 locking with lock portions 101A which protrude from the base 101 and can move back and forth freely towards and away from the rail part 103. In this position, the bare optical fiber F1 of the inserted optical fiber F held by the optical fiber holder 90 is inserted into the inside of the optical connector.

The bare optical fiber F1 enters the inner groove 73a with a large diameter in the elements 73A and 73B of the clamp part 73 of the optical connector 80 supported by the optical connector support part 102 (refer to FIG. 8 to FIG. 9B). The bare optical fiber F1 is inserted into the inner groove 73b with a small diameter, and the optical fiber F2 is inserted into the inner groove 73a with a large diameter.

As described above, since the front end face F3 of the inserted optical fiber F held by the optical fiber holder 90 is formed such that it is aligned with the bevel direction of the rear end face G1 of the internal optical fiber G of the optical connector 80 supported by the optical connector support part 102, it is possible to butt and connect the bare optical fiber F1 of the inserted optical fiber F to the internal optical fiber G in the inner groove 73b with a small diameter (refer to FIG. 2).

That is, since the bevel angle θ2 of the front end face F3 is almost the same as the bevel angle θ1 of the rear end face G1, and the phases of the front end face F3 and the rear end face G1 approximately coincide, it is possible to butt and connect the front end face F3 to the rear end face G1 without a gap.

Figure 11A:
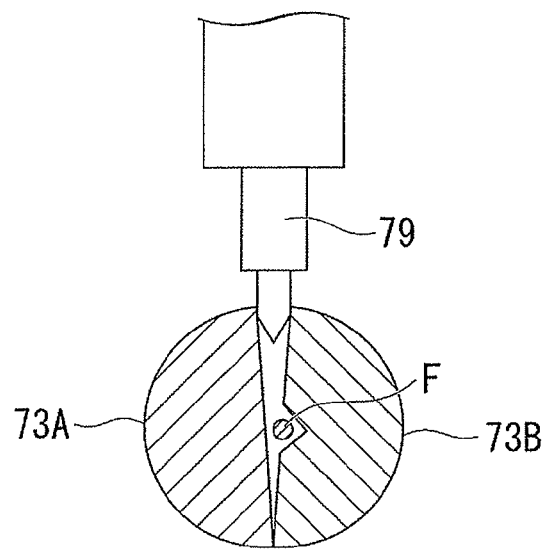
FIG. 11A is an explanatory view showing opening and closing operations of an element in the optical connector.
Figure 11B:
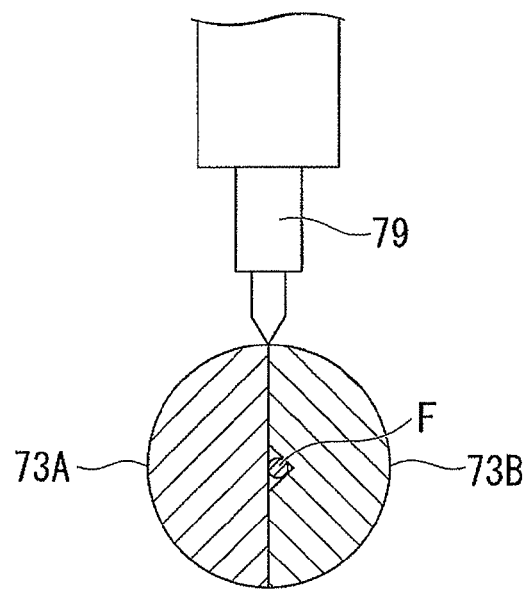
FIG. 11B is an explanatory view showing opening and closing operations of an element in the optical connector.

As shown in FIG. 11A and FIG. 11B, while maintaining the state in which the bare optical fiber F1 of the front end of the inserted optical fiber F and the internal optical fiber G are butted, if the insert member 79 inserted between the elements 73A and 73B is pulled out from between the elements 73A and 73B, the elements 73A and 73B close up due to the elasticity of the C type spring 73C, and the internal optical fiber G and the inserted optical fiber F are clamped together so that the connection state is maintained.

According to the above-described connection method, it is possible to transfer the optical fiber holder 90 used for front end processing in the front end bevel processing tool 40, to the optical fiber connection tool 71 as it is to perform an optical fiber connection operation.

Accordingly, since the attitude of the inserted optical fiber F at the time of the connection operation can be aligned with the attitude at the time of front end processing, it is possible for the bevel direction of the front end face F3 of the inserted optical fiber F and the bevel direction of the rear end face G1 of the internal optical fiber G in the optical fiber connection tool 71 to be aligned accurately. As a result, reflections at the front end faces of the optical fibers F and G are reduced, so that a connection with low loss can be realized.

Furthermore, at the time of the connection operation, since it is not necessary to adjust the bevel direction of the front end face F3 of the inserted optical fiber F, manipulation is easy.

Accordingly, the operation for assembling the optical connector 80 at the front end of the inserted optical fiber F in the field is simplified.

Moreover, by beveling the end faces of the optical fibers F and G, the reflected return light can be reduced at the end faces. Therefore it is possible to reduce the noise at the time of connection. As a result, it may also be used for image system lines.

The optical connector 80 can be exemplified by LC type optical connectors (Lucent Company brand), SC type optical connectors (JIS C5973), SC2 type optical connectors, MU type optical connectors (JIS C5983), and the like.

The optical connector as shown in FIG. 3 and FIG. 4 is a field assembly type optical connector, and a jig is provided for inserting and withdrawing a wedge. The structure of this is described in detail in U.S. Pat. No. 7,346,255, Title of the Invention: TOOL FOR OPTICAL CONNECTOR AND TOOL EQUIPPED OPTICAL CONNECTOR.

The above-described connection method can be rephrased as in the following. Firstly, the optical connector is fixed in a first location. At this location, the front end face of the internal optical fiber G is fixed such that it has a predetermined bevel direction relative to a first reference plane in the first location. The first reference plane is defined as the inner surface 103a (support base reference plane) of the holder support base, or another imaginary reference plane.

Next, the inserted optical fiber F is beveled such that it has a predetermined bevel direction relative to the second reference plane. The bevel direction of the inserted optical fiber F is fixed relative to the second reference plane.

The second reference plane is defined as the underside surface 90a (holder support surface), or another imaginary reference plane.

Next, the first reference plane and the second reference plane are aligned, the inserted optical fiber F is pushed out toward the optical connector, and the front end face of the inserted optical fiber F and the front end face of the internal optical fiber G are aligned.

The optical connector used in the present invention is not limited to a field assembly type optical connector, and a mechanical splicing unit may also be used.

Mechanical splice means a method in which the extended bare optical fiber ends of a pair of optical fibers are positioned and butted inside of the holding members of the mechanical splice body, and mechanically fixed and connected, including the vicinity of the ends, using a clamp member.

The structure of a mechanical splice is described in detail in U.S. Pat. No. 5,963,699 (OPTICAL FIBER MECHANICAL SPLICE).

Hereunder is a description of an optical fiber connection method in the case where a mechanical splicing unit is used for an optical connector.

Figure 12A:
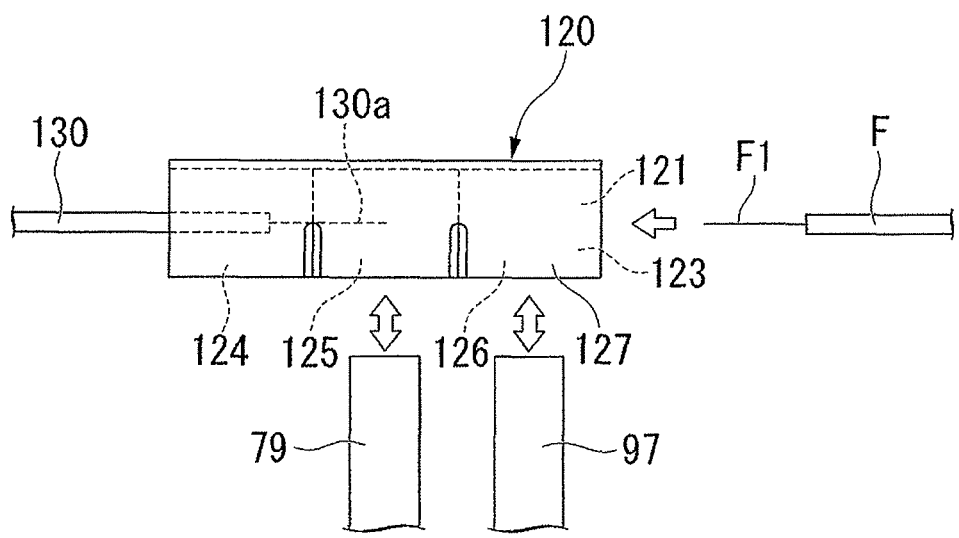
FIG. 12A is a plan view showing another example of an optical connector that can be used in the optical fiber connection method of the present invention.
Figure 12B:
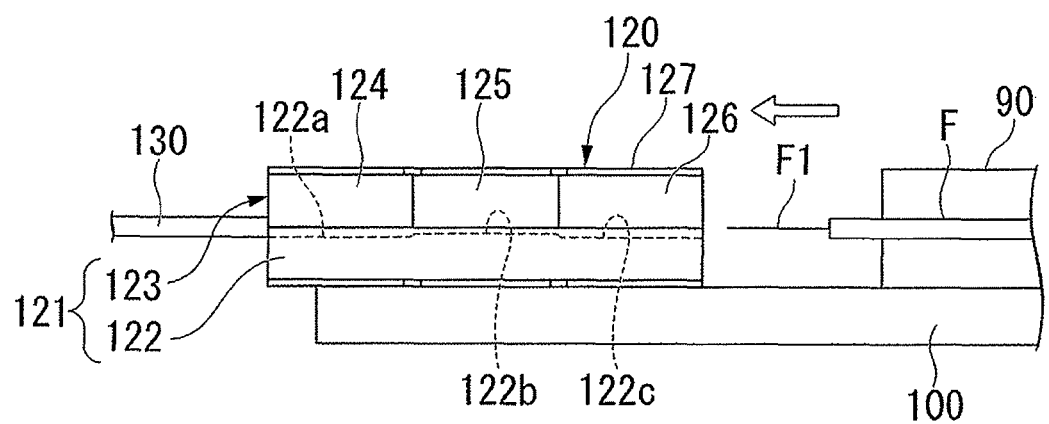
FIG. 12B is a front view showing the optical connector shown in the previous figure.

As shown in FIG. 12A and FIG. 12B, the optical connector 120 is a mechanical splice having a connecting element 121, and a clamp spring 127 which is provided on the outside of the connecting element 121.

The connecting element 121 has a two piece structure in which a base side element 122 and a lid side element 123 are combined, and the lid side element 123 is divided into three, being a first lid side element 124, a second lid side element 125, and a third lid side element 126, in the axial direction.

Aligning grooves 122a, 122b, and 122c are formed in the base side element 122 in locations corresponding to the first to third lid side elements 124 to 126, by which the optical fiber 130 and the inserted optical fiber F can be aligned.

As shown in FIG. 10A and FIG. 10B, the front end of the inserted optical fiber F is processed by the front end bevel processing tool 110 in a state in which it is held by the optical fiber holder 90 to form a beveled front end face F3.

The bevel direction of the front end face F3 is set such that when the optical fiber holder 90 is placed on the holder support base 100, it lies in the bevel direction of the end face of the optical fiber 130 held by the optical connector 120 supported by the optical connector support part 102 (refer to FIG. 1).

Next, the optical fiber holder 90 is transferred to the holder support base 100 of the optical fiber connection tool 71. At this time, it is arranged such that the optical fiber holder 90 is in the same attitude as when processing the front end (refer to FIG. 1 and FIG. 2).

The optical connector 120 is supported by the optical connector support part 102. The optical fiber 130 (first optical fiber; one optical fiber) is inserted in the optical connector 120 from one side of the connector 120 in advance, and its front end part 130a is placed in the aligning groove 122b.

As shown in FIG. 12A and FIG. 12B, if the optical fiber holder 90 is slid toward the optical connector 120 along the rail part 103 in a state in which the space between the elements 122 and 123 is expanded by the insert member 79, the inserted optical fiber F is inserted along the aligning groove 122a from the other end side of the connecting element 121.

Since the front end face F3 of the inserted optical fiber F is formed such that it lies in the bevel direction of the end face of the optical fiber 130, the inserted optical fiber F is butted and connected to the optical fiber 130 (refer to FIG. 2).

When the insert member 79 is pulled out from between the elements 122 and 123, the optical fiber 130 and the inserted optical fiber F are clamped and fixed due to the elasticity of the clamp spring 127, and the connection state is maintained.

Next is a description of another embodiment of a field assembly type optical connector that can be used in the present invention.

Figure 22:
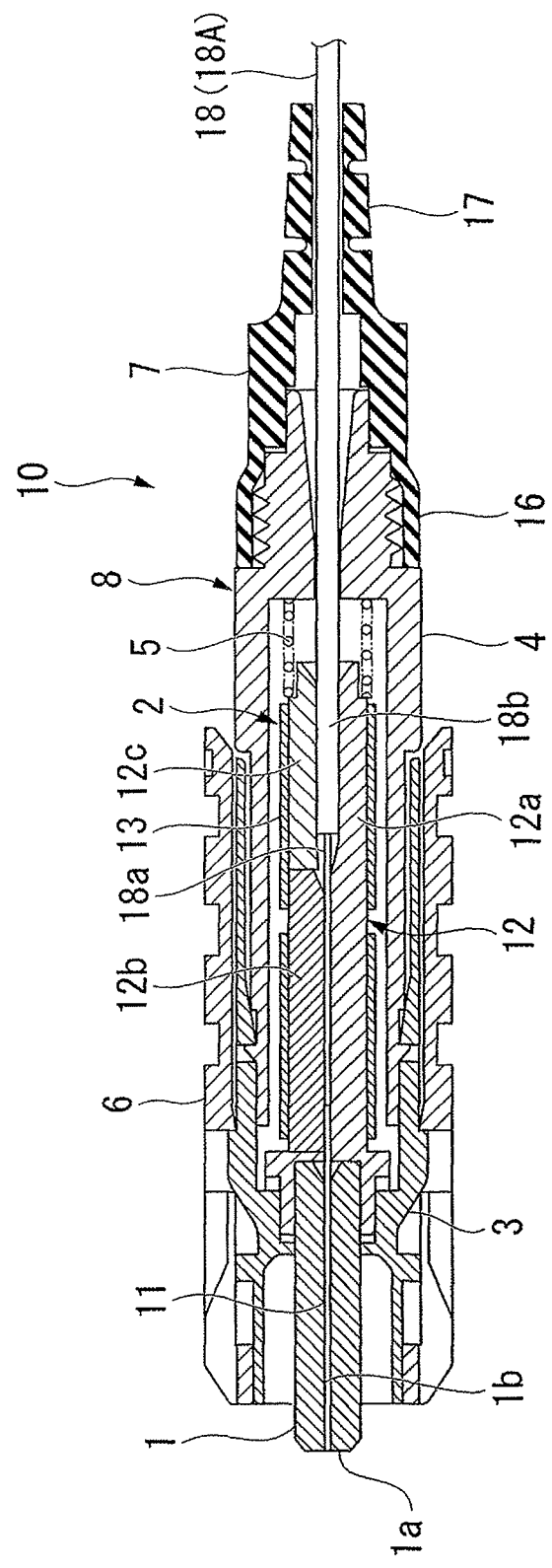
FIG. 22 is a cross-sectional view showing an optical connector in which the present invention can be used.

FIG. 22 is a cross-sectional view showing a field assembly type optical connector 10 applicable to the present invention. The optical connector of the present embodiment is used when a short length optical fiber, which has been adhered and fixed in an optical ferrule in a factory, and an optical fiber that extends out of an optical fiber cable or the like, are connected at a connection filed at the users house or the like, similarly to the field assembly type optical connector as shown in FIG. 7 and FIG. 8.

The optical connector of the present embodiment uses, as a method of connecting the optical fibers, a method in which the vicinity of the connection part of the two optical fibers is pressed by a fixing member, and the connection part to which the end faces of the optical fibers are butted is fixed (clamped) by mechanical spring pressure, similarly to the field assembly type optical connector as shown in FIG. 7 and FIG. 8.

Figure 23:
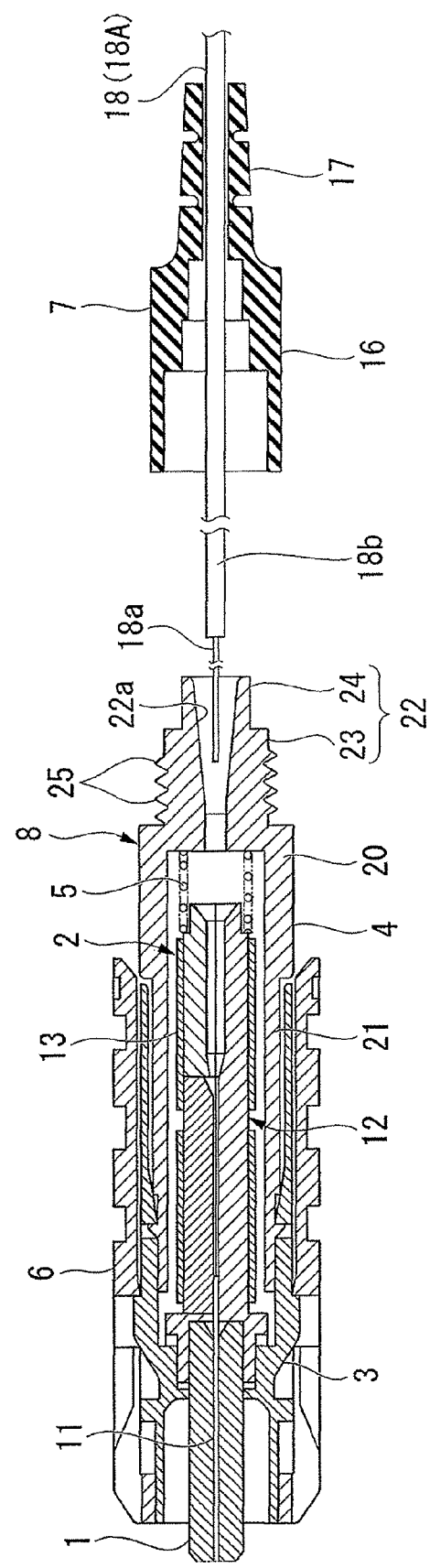
FIG. 23 is an optical connector in a state prior to assembly.
Figure 24:
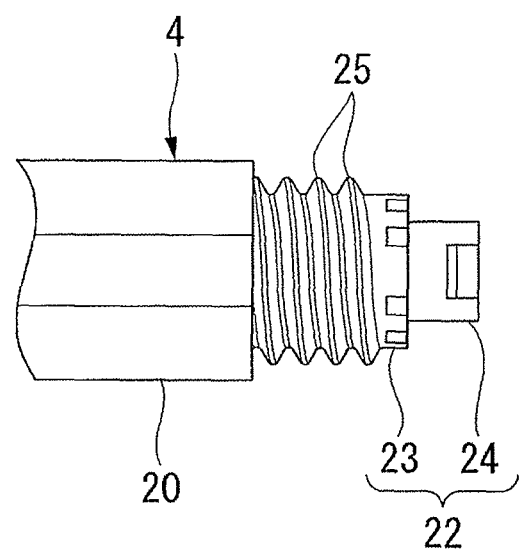
FIG. 24 is a side elevation view showing the main parts of a stop ring.
Figure 25:
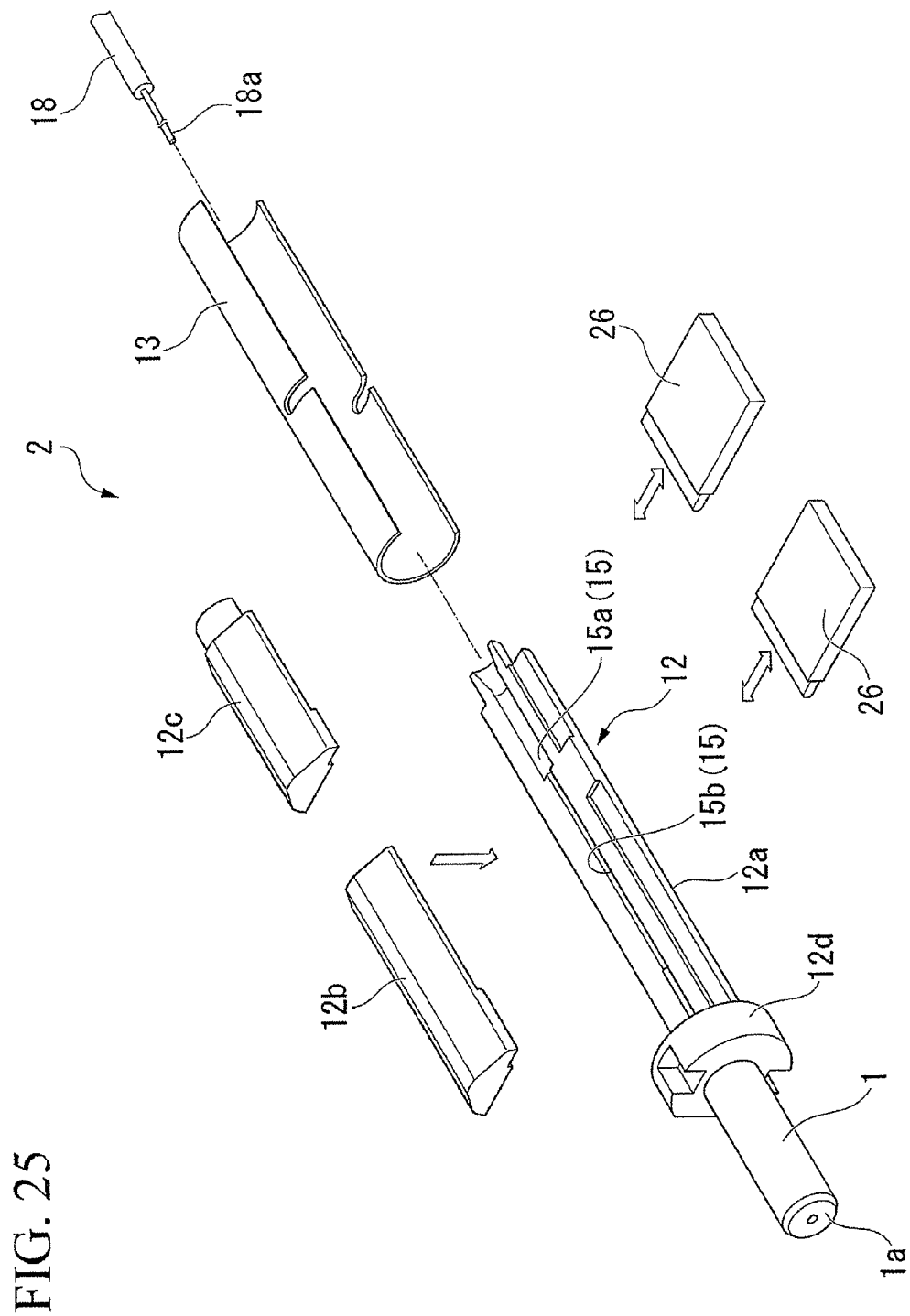
FIG. 25 is an exploded perspective view showing a holding part.
Figure 26:
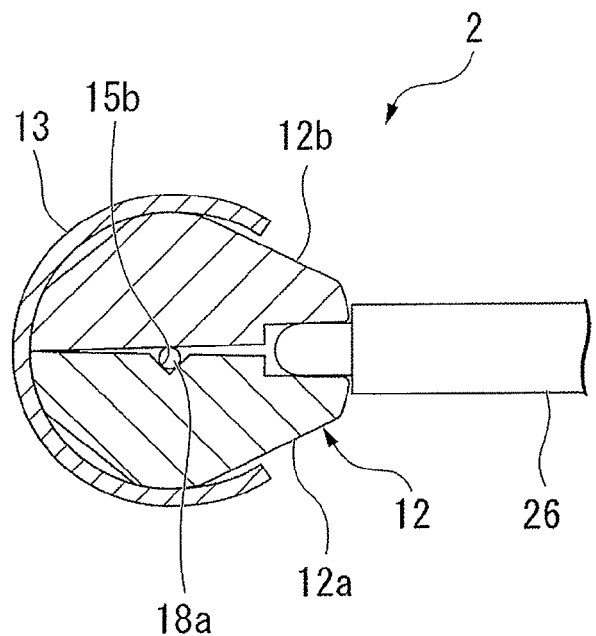
FIG. 26 is a cross-sectional view showing the holding part.
Figure 27:
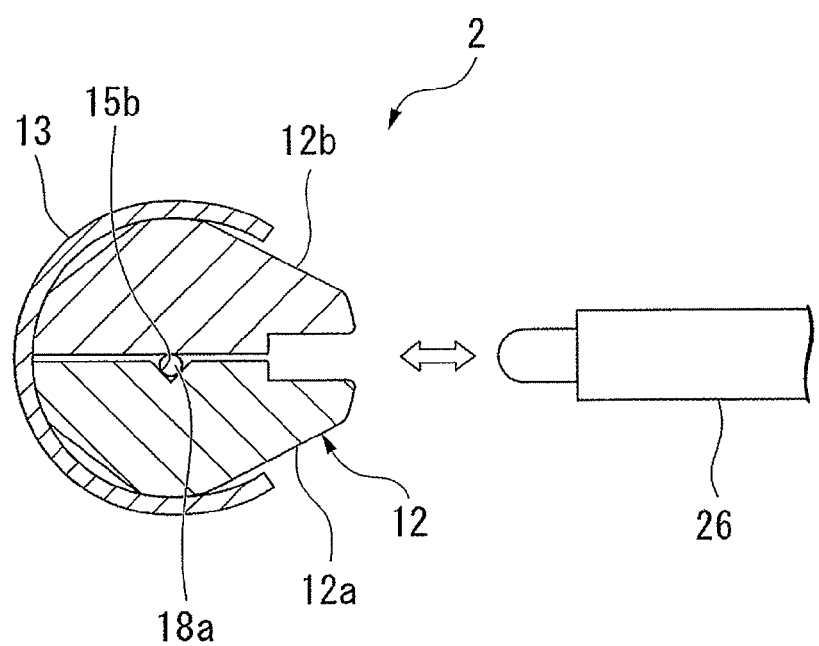
FIG. 27 is a cross-sectional view showing the holding part.

FIG. 23 shows the optical connector 10 in a state prior to assembly. FIG. 24 is a side view showing the main parts of a stop ring 4. FIG. 25 is an exploded perspective view showing a holding part 2. FIG. 26 and FIG. 27 are cross-sectional views showing the holding part 2.

In the following description, the left hand side of FIG. 22 is sometimes referred to as the front, and the right hand side is sometimes referred to as the rear.

As shown in FIG. 22, the optical connector 10 comprises: an optical ferrule 1 (referred to hereunder simply as the ferrule); a holding part 2 (corresponding to the clamp part 73 in FIG. 8) provided at the rear end side of the ferrule 1; a plug frame 3 for housing the holding part 2; a stop ring 4 installed in the plug frame 3, an urging device 5 provided in the stop ring 4; and a cup ring 6 provided on the outside of the plug frame 3. Reference symbol 7 denotes a boot part installed at the rear end of the stop ring 4.

The plug frame 3 and the stop ring 4 form a housing 8 for housing the holding part 2.

Similarly to FIG. 9A and FIG. 9B, an optical fiber installation hole 1b is formed along the central axis in the ferrule 1, and a captive optical fiber 11 (bare optical fiber, or the like) is inserted and fixed in the optical fiber installation hole 1b. The front end of the captive optical fiber 11 is exposed at the front end face 1a of the ferrule 1, the rear end protrudes from the rear end of the ferrule 1, and the protruding part is located inside the holding part 2.

The ferrule 1 can be formed using a ceramic such as zirconia or glass for example.

The rear end face 11A (front end face) of the captive optical fiber 11 (refer to FIG. 20) may also be made perpendicular to the optical fiber axis direction. However, it may also be formed beveled relative to the surface perpendicular to the optical fiber axis direction. The bevel angle $\theta 1$ may be 7 to 9 degrees relative to the optical fiber optical axis direction, and more specifically may be approximately 8 degrees. The bevel angle is not limited to this, and any other angle outside the range may also be used.

As shown in FIG. 23, the holding part 2 is a clamp part, which has a support element unit 12, and a clamp spring 13 for holding the support element unit 12.

The support element unit 12 comprises; a flange part 12d provided at the rear end part of the ferrule 1, a base part 12a (base side holding element) extending toward the rear from the flange part 12d, and two lids 12b and 12c (lid holding elements) located on the base part 12a. By means of the elasticity of the clamp spring 13, the optical fiber can be clamped and fixed between the base part 12a and the lids 12b and 12c.

The base part 12a has an approximately semicircular cross-section or an approximately triangular cross-section, may be formed integrally with a flange part 7d, and may be constructed from metal, plastic, or the like.

The lid 12b and the lid 12c have approximately semicircular cross-sections or, approximately triangular cross-sections, may be constructed from plastic, metal or the like, and are located in line on the front and back of the base part 12a. The first lid 12b is located in front of the second lid 12c, that is, on the ferrule 1 side.

An alignment mechanism 15 is formed in the holding element unit 12. The alignment mechanism 15 comprises a groove formed in the inner surface of the base part 12a and the inner surfaces of the lids 12b and 12c, and has a jacket holding part 15a formed in the rear end part of the base part 12a and the rear of the lid 12c, and an aligning part 15b formed on the ferrule 1 side of the jacket holding part 15a.

The width of the aligning part 15b is formed narrower than that of the guide part 15a, and the aligning part 15b positions and aligns the captive optical fiber 11 and a front end part 18a of an optical fiber 18 between the base part 12a and the first lid 12b, and butts and connects them via a refractive index matching agent.

The jacket holding part 15a can sandwich and fix the jacket 18b of the optical fiber 18 between the second lid 12c and the base part 12a.

The clamp spring 13 is a device for applying a clamping force to the holding element unit 12, and is a metal plate with a C-shaped cross-section in the example in the drawing.

The end part 18a is a bare optical fiber extending from the optical fiber 18, which is an optical fiber with a jacket such as an optical fiber core, or an optical fiber cable. The jacket 18b is a jacket made from a synthetic resin or the like.

When the optical connector 10 is connected to the other optical connector, an urging device 5 applies a butting force to the ferrule 1 between it and the optical connector on the other party side.

The urging device 5 is positioned between the rear end of the holding part 2 and the stop ring 4, and urges the holding part 2 and the ferrule 1 forward, with the reactive force being taken by the stop ring 4. For the urging device 5, a coil spring is suitable.

As shown in FIG. 23 and FIG. 24, the stop ring 4 comprises a rectangular body part 20, a forward extension part 21 extending from the body part 20 into a plug frame 3, and a fixing part (securing part) 22 extending backward from the rear end part of the body part 20.

The fixing part 22 has a cylindrical tube part 23, and an extension tube part 24 extending backward from its rear end.

A screw part 25 is formed in the outer peripheral surface of the tube part 23.

The extension tube part 24 is a cylinder with a smaller diameter, meaning it has a smaller outer diameter, than the tube part 23.

The boot part 7 is made from a comparatively flexible synthetic resin such as rubber, and has a cylindrical mounting part 16, and an extension tube part 17 extending from its rear end. The mounting part 16 can be engaged due to its elasticity, in a state in which it covers the tube part 23 of the fixing part 22.

For a basic structure of the optical connector 10, the basic structure of an SC type optical connector (SC: Single Fiber Coupling Optical Fiber Connector. F04 type optical connector (optical connector plug), etc. defined in HS C 5973), an SC2 type optical connector, or the like, can be used.

Figure 13:
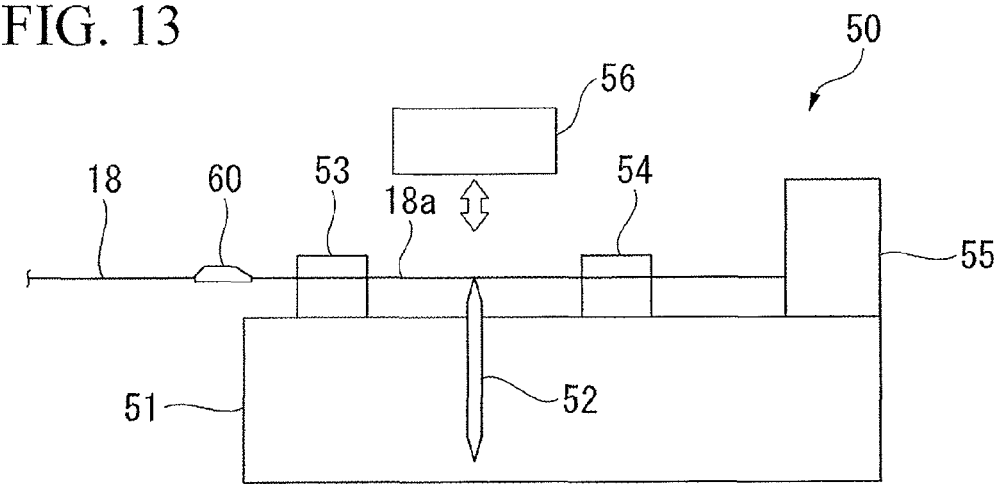
FIG. 13 is a view showing, schematically, the structure of a front end bevel processing tool, which is an example of a front end bevel processing tool used in the present invention.

FIG. 13 is a schematic view of a front end bevel processing tool (also called an optical fiber cutter) used in the present invention. An front end bevel processing tool 50 comprises: a base 51; a disc shaped cutter (knife) 52 formed in the base 51; optical fiber holding parts 53 and 54, which are provided in one side and the other side of the cutter 52, press and fix the optical fiber to the base, and have lids that can be opened and closed freely; an optical fiber fixing part 55 for fixing one end of an optical fiber 18 (second optical fiber; the other optical fiber), being an object to be processed; and a lid part (cover) 56.

Figure 15:
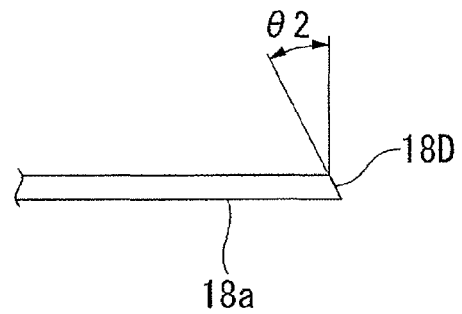
FIG. 15 is a side view showing the front end part of the optical fiber on the insertion side.

The optical fiber 18 is held by the optical fiber holding parts 53 and 54, and the front end part 18a is processed using the cutter 52 to form a beveled front end face 18D (refer to FIG. 15). The bevel angle $\theta 2$ may be almost equal to the bevel angle $\theta 1$ (refer to FIG. 20) of the rear end face 11A of the captive optical fiber 11 (first optical fiber; one optical fiber), to be specific may be 7 to 9 degrees, and most preferably may be approximately 8 degrees.

In the figure, the blade of the cutter 52 is oriented perpendicular to the optical axis of the optical fiber. However, as is well known, if an optical fiber is twisted along the rotation direction of the axis, the cutting plane can be inclined. The bevel angle can be set appropriately by the twist angle. FIG. 13 is a schematic view, and since an optical fiber cutter (also called a cleaver) having a mechanism for twisting is well known, the detailed mechanism is omitted. For a front end bevel processing tool, an Angled Fiber Optic Cleaver "MAX CI-08" from Ilsinteeh Co., Ltd. can be used, for example.

Figure 14:
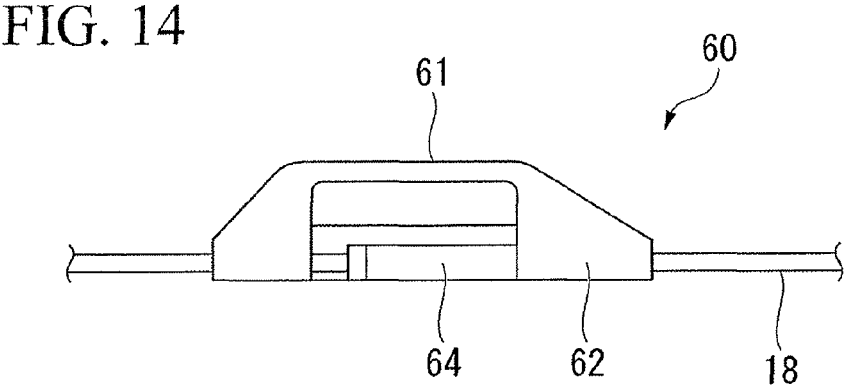
FIG. 14 is a side view showing a marking member.

It is possible for the optical connector of the present embodiment to use another connection method instead of using the connection tool of the above-described embodiment. As shown in FIG. 13 and FIG. 14, at the time of this processing, a marking member 60 (also called a connection jig) made from a resin is attached to an optical fiber 18 in a predetermined position.

The marking member 60 enables visual confirmation of the location of the optical fiber 18 in the circumferential direction. When it is installed on the optical fiber 18, it becomes a non-rotationally symmetrical shape (a shape that is not rotationally symmetrical) about the axis of the optical fiber 18. Here, "rotationally symmetrical about the axis" means that when rotated by a predetermined angle (excluding 360°) about the axis, it retains the original form.

Figure 16:
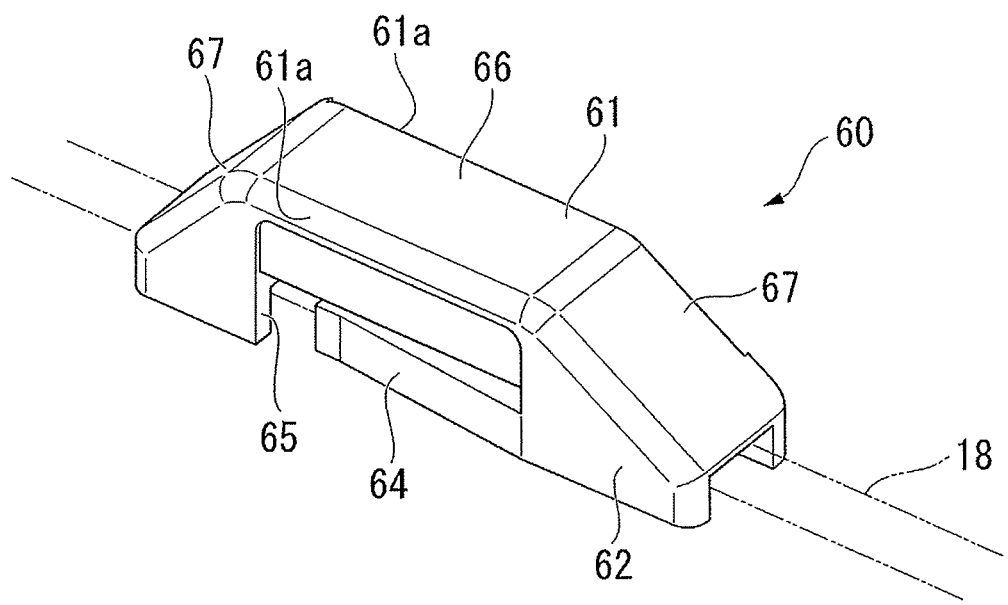
FIG. 16 is a perspective view showing the marking member.
Figure 17:
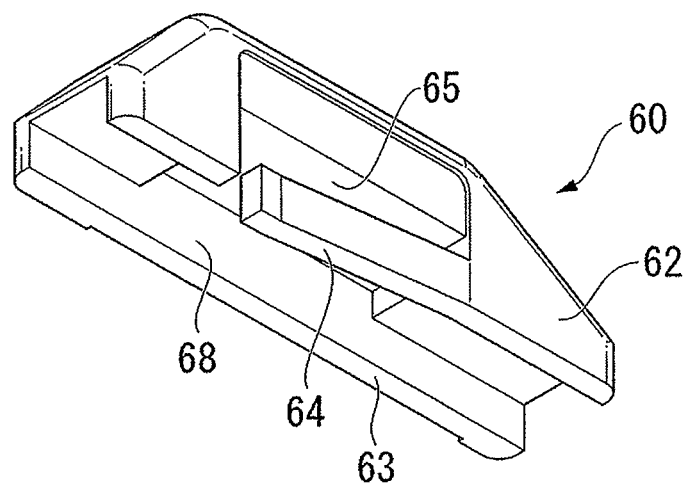
FIG. 17 is a perspective view showing the marking member.

As shown in FIG. 16 and FIG. 17, the marking member 60 in the example illustrated comprises a top plate 61, side plates 62 and 63 which hang down from their side edges 61a, and a spring piece 64 formed in one side plate 62.

The top plate 61 has a rectangular top surface part 66, and beveled parts 67 extending diagonally downward such that they lead away from each other from the two ends of the top surface part 66.

The spring piece 64 is formed at the side of a notch part 65 formed in the lower part of one side plate 62. The spring piece 64 extends such that it approaches the other side plate 63 in the lengthwise direction of the top surface part 66, and can be bent and deformed resiliently.

The spring piece 64 can be attached or detached with respect to the optical fiber 18 by constructing it such that it can sandwich and latch the optical fiber 18 between itself and the other side plate 63.

The side plates 62 and 63 extend further downward from the bottom end of the inclined part 67, and the space between the side plates 62 and 63 in this area becomes an optical fiber insertion part 68 for the optical fiber 18 to be inserted.

As shown in FIG. 13 and FIG. 14, since the bevel direction of the cutting plane of the optical fiber, which is mounted on the base 51 and cut, is determined by the specification of the front end bevel processing tool 50, installation of the marking member 60 on the optical fiber 18 is performed in a state in which the fiber is mounted on the base 51. The marking member 60 can be installed appropriately before or after the bevel processing.

The marking member 60 is installed on the optical fiber 18 such that the plate direction of the side plates 62 and 63 is directed in the perpendicular direction (directed perpendicular to the base 51).

In this manner, since the relationship between the orientation of the side plates 62 and 63 of the marking member 60 and the bevel direction of the front end face 18D is determined, it is possible to confirm easily and visually the bevel direction of the front end face 18D of the optical fiber 18 by the orientation of the marking member 60.

That is, it is possible for the rotational orientation of the optical fiber to be indicated by the rotational orientation of the side plates of the marking member.

Since the role of the marking member is to make it easier to grasp the optical fiber, and to enable the rotational orientation (bevel direction) of the optical fiber to be confirmed visually, a simple construction other than the present embodiment can be used for the marking member. For example, it is also possible to use a simple construction such as a sticky tape in which an optical fiber is sandwiched and adhered. In this case, confirmation is possible with the direction that the surplus length of the sticky tape extends indicating the orientation of the optical fiber.

In the optical connector 10 into which the beveled optical fiber 18 is inserted, as shown in FIG. 26, a wedge 26 is inserted between the lids 12b and 12c and the base part 12a of the holding element unit 12, so that become a state in which the space between the lids 12b and 12c and the base part 12a is expanded against the clamping force of the clamp spring 13.

Figure 18:
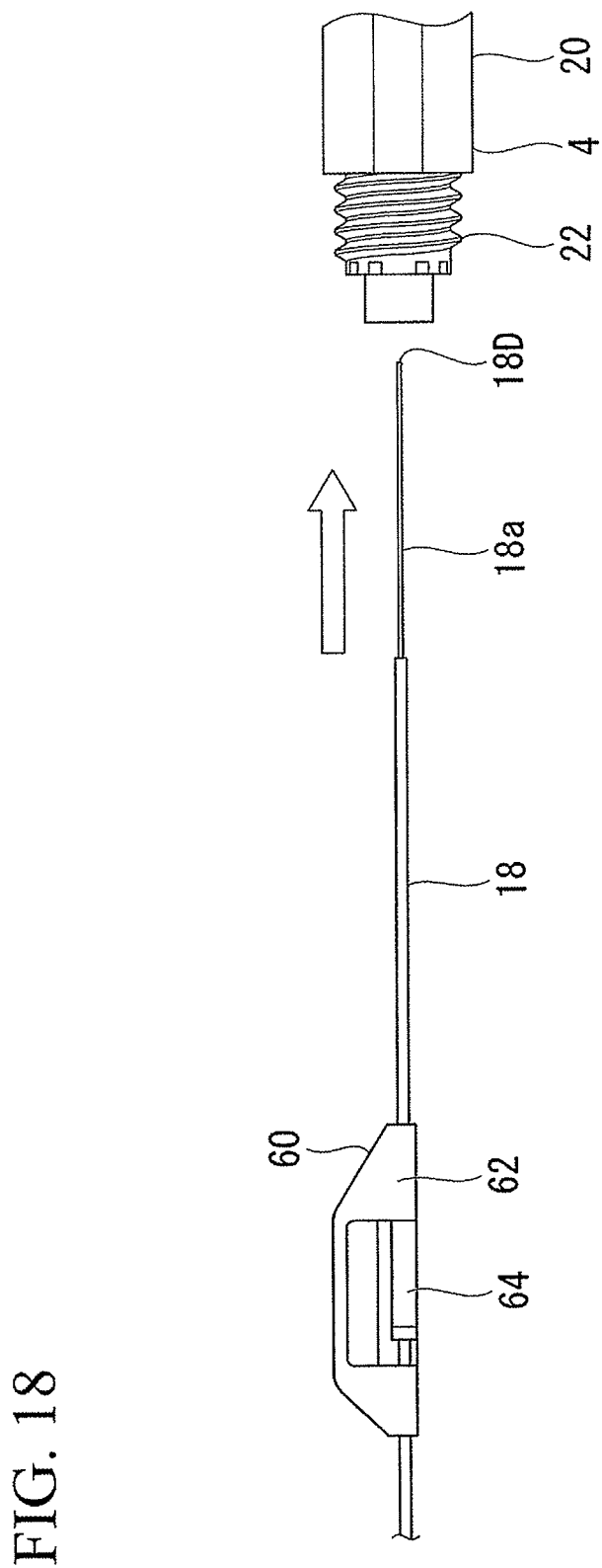
FIG. 18 is a process drawing showing the operation of connecting the optical fibers.
Figure 19:
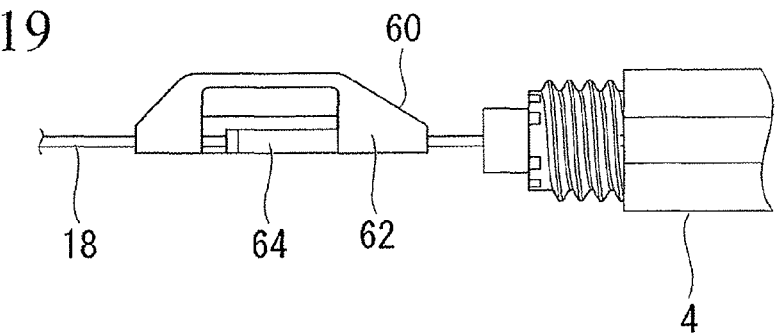
FIG. 19 is the process drawing following the previous drawing.

As shown in FIG. 18 and FIG. 19, the optical fiber 18 (first optical fiber 18A) is inserted into an insertion hole 22a of the fixing part 22 of the stop ring 4 (refer to FIG. 22 and FIG. 23).

The end part 18a is inserted from the jacket holding part 15a of the holding element unit 12, guided to the aligning part 15b, and butted and connected to the captive optical fiber (also called internal optical fiber in the present invention) 11.

Figure 20:
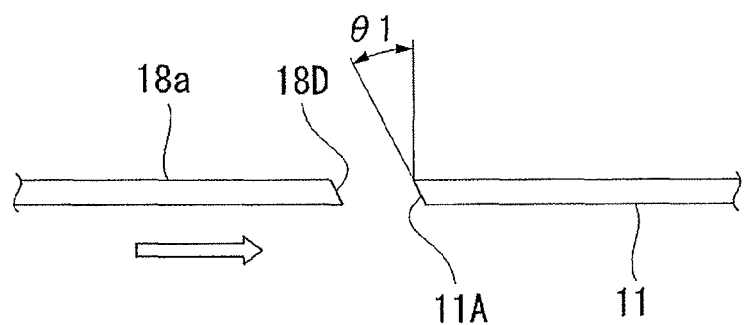
FIG. 20 is an explanatory view showing the front end parts of the optical fibers being butted and connected.

As shown in FIG. 19 and FIG. 20, since the rear end face 11A of the captive optical fiber 11 in the optical connector 10 is fixed in advance such that it has a predetermined bevel direction, it is possible to accurately align the bevel direction of the front end face 18D of the optical fiber 18 with the bevel direction of the rear end face 11A of the captive optical fiber 11 in the optical connector 10 by inserting the optical fiber 18 into the optical connector 10 in a state in which the marking member 60 is orientated in a predetermined direction (for example, in the direction in which the side plates 62 and 63 are vertical). That is, it is possible to align the phases of the beveled end faces of the optical fibers so that they are on the same plane.

As a result, the reflections at the front end faces of the optical fibers 11 and 18 are reduced, so that a connection with low loss can be realized. Furthermore, the operation for assembling the optical connector 10 in the field is simplified.

It is possible to use a refractive index matching agent between the front end faces of the optical fibers.

As shown in FIG. 27, when the wedge 26 is pulled out, the optical fiber 11 and the end part 18a are sandwiched between the first lid 12b and the base part 12a due to the elasticity of the clamp spring 13, so that the connection of the optical fibers 11 and 18 is maintained.

As shown in FIG. 22, the jacket 18b of the optical fiber 18 is sandwiched and fixed between the second lid 12c and the base part 12a. The boot part 7 is mounted on the tube part 23 of the fixing part 22.

Figure 21:
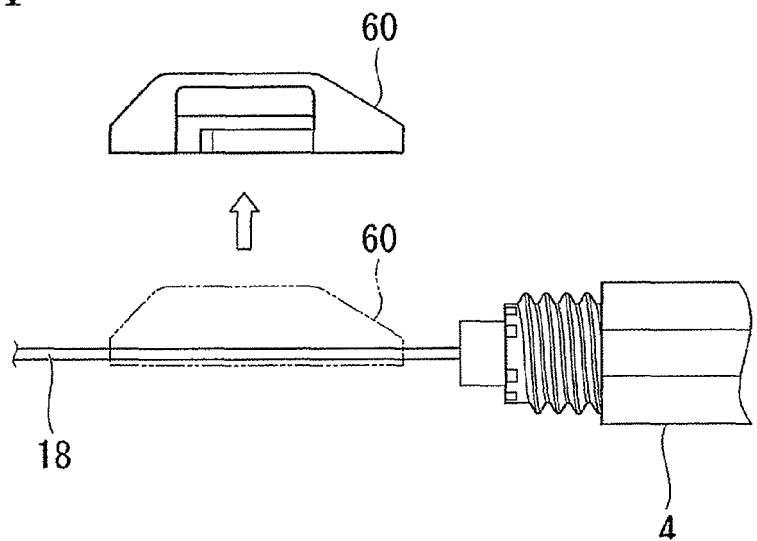
FIG. 21 is a process drawing showing the operation of connecting the optical fibers.

As shown in FIG. 21, the connection operation is completed by removing the marking member 60 from the optical fiber 18.

In the case where the front end face is beveled, it is necessary to accurately adjust not only the machining accuracy of the bevel directions of the end faces but also the accuracy of the rotation angles of the optical fibers about the axis, match the phases of the end faces when the front end faces of the optical fibers are faced and butted, and adjust such that there is no gap between the front end faces of the facing optical fibers. However, this adjustment operation of the bevel directions is difficult.

Therefore, currently, by using a pen to mark the outer surface of the optical fiber with ink at a predetermined location, the bevel direction of the end face is indicated approximately. However, since it is difficult to place a mark at the correct location on the outer surface of an optical fiber with a diameter no greater than 250 μm to 900 μm it is difficult to align the bevel directions of the front end faces accurately using marking as a guide.

According to the embodiment of the present invention, by attaching a connection jig to the outside of an optical fiber to indicate the bevel direction of the front end face of the optical fiber, and butting and connecting it with an optical fiber whose bevel direction is known in advance in a state in which the connection jig is orientated in a predetermined direction, it is possible to accurately align the bevel direction of the front end face of the above-described optical fiber with the bevel direction of the mating connection. That is, it is possible to match the phases of the beveled front end faces accurately.

Accordingly, the reflections at the front end faces of the optical fibers are reduced, so that a connection with low loss can be realized. Furthermore, the operation for assembling the optical connector in the field is simplified.

The marking member is not limited to one made from resin, and it is also possible to form it from other materials such as metal.

If the above-described optical connector is delivered to a site where a connection is to be performed in a state in which a wedge is inserted between the base part and the lid of the holding element unit in advance, and fitted to the optical connector (optical connector with a tool), the connection operation can be performed efficiently.

Since the jacket holding part 15*a* of the holding part 2 of the optical connector 10 has a structure in which the jacket 18*b* of the optical fiber 18 is sandwiched and fixed between the second lid 12*c* and the base part 12*a*, an optical fiber with a different jacket diameter cannot be gripped, or the holding force becomes extremely weak, reducing the tensile strength.

In contrast, by using a spacer tube 19 as described later, the holding force is increased, so that it is practicable to connect a plurality of kinds of optical fibers with different outer diameters. The fact that assembly at the front end is possible implies that a strong holding force can be realized.

Hereunder is a description of the structure of the optical connector 10 for each type of optical fiber in the case where a plurality of types of optical fiber is used.

In the example shown in FIG. 22 and FIG. 23, a first optical fiber 18A with a comparatively large outer diameter is used. The first optical fiber 18A is exemplified by an optical fiber with an outer diameter of 0.9 mm.

For the first optical fiber 18A, an optical fiber (so-called 0.4 silicon/0.9 nylon) can be used in which a nylon jacket with an outer diameter of 0.9 mm is applied to a cable obtained by applying a silicon jacket with an outer diameter of 0.4 mm to a glass optical fiber with an outer diameter of 0.125 mm (quartz system optical fiber, similarly hereunder).

Moreover, an optical fiber (so-called 0.25UV/0.9PVC) can also be used in which a polyvinyl chloride (referred to hereunder as PVC resin) jacket with an outer diameter of 0.9 mm is applied to an optical fiber in which an ultraviolet-hardening type resin (referred to hereunder as UV resin) jacket with an outer diameter of 0.25 mm is applied to a glass optical fiber with an outer diameter of 0.125 mm.

In addition, for a jacket material, a variety of types can be used, but whatever is used, in this example, the outer diameter is 0.9 mm. Since an optical fiber with a diameter of 0.9 mm is globally used as a standard, an optical connector to which an optical fiber with a diameter of 0.9 mm can be connected is very important.

Next is a description of the case where it is used for a second optical fiber 18B, which is an optical fiber 18 with a smaller diameter than the first optical fiber 18A. The second optical fiber 18B is exemplified by an optical fiber with an outer diameter of 0.25 mm.

For the second optical fiber 18B, an optical fiber can be used in which a UV resin jacket with an outer diameter of 0.25 mm is applied to a glass optical fiber with an outer diameter of 0.125 mm, for example.

Since the optical fiber with a diameter of 0.25 mm is globally used as a standard, an optical connector to which an optical fiber with a diameter of 0.25 mm can be connected is very important.

Figure 28:
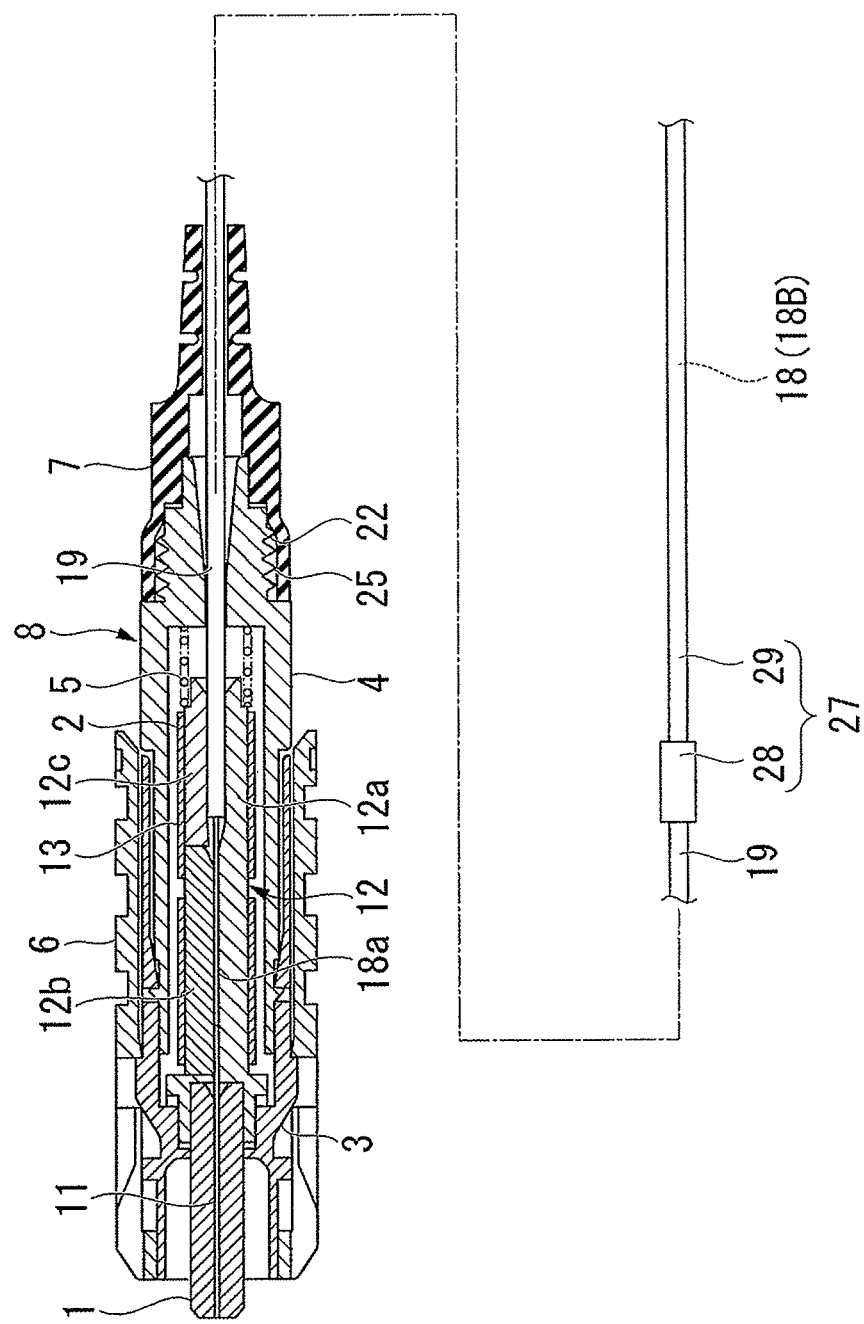
FIG. 28 is a cross-sectional view showing an example in which the optical connector is used for another optical fiber.
Figure 29:
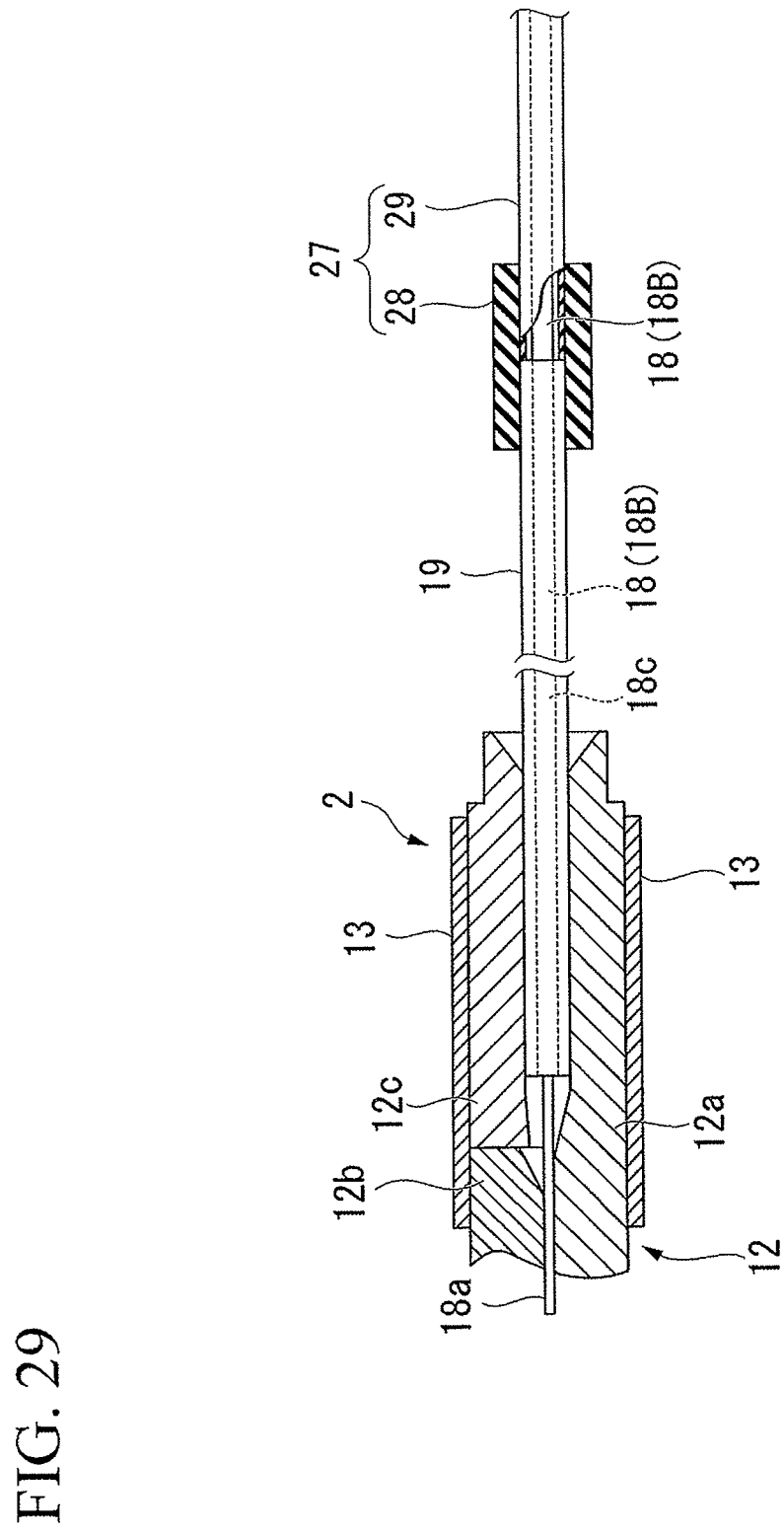
FIG. 29 is an enlarged view of the main parts showing a state in which the optical fibers are fixed.

FIG. 28 and FIG. 29 show the structure of the optical connector 10 in the case where the second optical fiber 18B is used. In the optical connector 10 in this example, the front end part 18*a* of the second optical fiber 18B is extended similarly to the first optical fiber 18A, and the spacer tube 19 covers the surface of a jacket 18*c*.

Figure 30:
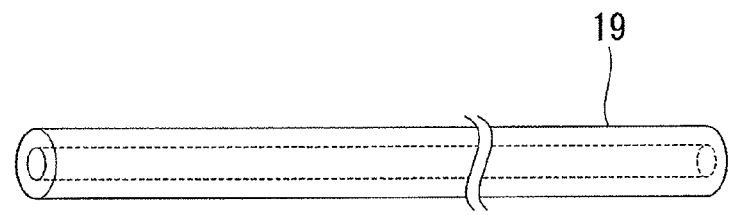
FIG. 30 is a perspective view showing a spacer tube.

As shown in FIG. 29 and FIG. 30, the spacer tube 19 is made from a flexible synthetic resin material or the like, and its outer diameter is set such that it is sandwiched between the second lid 12*c* and the base part 12*a* in the holding part 2 in a state in which it covers the second optical fiber 18B, and the optical fiber 18B can be fixed inside the tube 19. The spacer tube 19 can have almost the same or a slightly larger outer diameter as the jacket 18*b* of the first optical fiber 18A.

It is necessary to set the inner diameter of the spacer tube 19 such that when fixed in the holding part 2, even if a tensile force is applied to the second optical fiber 18B, the second optical fiber 18B does not fall out. For example, the inner diameter can be made to be almost the same as or slightly larger than the outer diameter of the second optical fiber 18B.

The outer diameter of the spacer tube 19 can be set to 0.93 mm, for example, and the inner diameter can be set to 0.28 mm, for example.

The spacer tube 19 is mounted in a predetermined range from the front end of the jacket 18*c* of the second optical fiber 18B.

That is, the spacer tube 19 must be mounted in at least the region that is holded by the holding element unit 12 in the holding part 2, and may not be mounted anywhere other than that. The spacer tube 19 can also be mounted over a range such that it extends outside of the optical connector 10.

The shape of the spacer tube 19 is not specifically limited. However, the cross-section may be symmetrical about the central axis.

Figure 31:
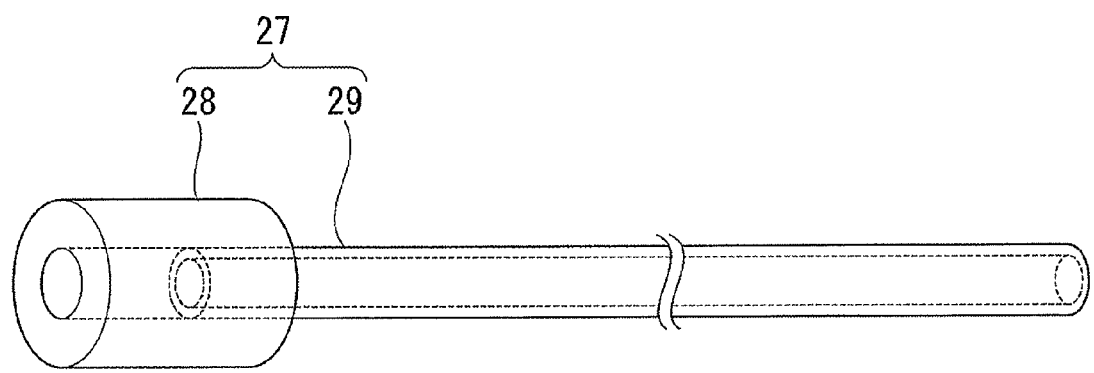
FIG. 31 is a perspective view showing a protective tube.

As shown in FIG. 29 and FIG. 31, a protective tube 27 can be provided at the rear end of the spacer tube 19.

The protective tube 27 comprises a connecting sleeve part 28, which can be attached at the rear end of the spacer tube 19, and a tube body 29, which extends from the rear end.

The connecting sleeve part 28 is made from a flexible synthetic resin material or the like, and its inner diameter is set such that the spacer tube 19 can be inserted into it. The inner diameter of the connecting sleeve part 28 is preferably almost the same as the outer diameter of the spacer tube 19, and it is preferable that it can engage with the spacer tube 19 by elasticity when the spacer tube 19 is inserted from the front end side.

The tube body 29 is made from a flexible synthetic resin material or the like, and is formed such that the optical fiber 18B can be inserted into it. If the inner diameter of the tube body 29 is set larger than the outer diameter of the optical fiber 18B to create a space between it and the optical fiber 18B, the optical fiber 18B can move easily inside the tube body 29. Therefore, the operation for inserting the optical fiber 18B is simplified.

Next is a description of a method for assembling the optical connector 10 at the front end of the second optical fiber 18B.

As shown in FIG. 28 and FIG. 29, the spacer tube 19 is mounted in a predetermined range from the front end of the jacket part 18c of the second optical fiber 18B, and the connecting sleeve part 28 of the protective tube 27 is installed on its rear end side.

This is inserted into the stop ring 4, the front end part 18a is butted and connected to the captive optical fiber 11 in the aligning part 15b, and the wedge 26 is pulled out (refer to FIG. 27). In this manner, the connection of the optical fibers 11 and 18B is maintained.

At this time, the spacer tube 19 of the second optical fiber 18B is sandwiched and fixed between the second lid 12c and the base part 12a. That is, the second optical fiber 18B is fixed in the holding part 2 via the spacer tube 19.

When the boot part 7 is mounted on the tube part 23 of the fixing part 22, the assembly of the optical connector 10 as shown 28 is completed.

In this manner, the optical connector 10 can also be used for a second optical fiber 18B with a comparatively small diameter by using the spacer tube 19.

In the case where it is used for an optical fiber with a smaller diameter than the second optical fiber 18B, it is possible to hold the optical fiber by using a thicker spacer tube than the spacer tube 19. In addition, by using a spacer tube with a thickness according to the diameter of the optical fiber, an optical fiber with a desired outer diameter can be fixed by the holding part 2.

Figure 32:
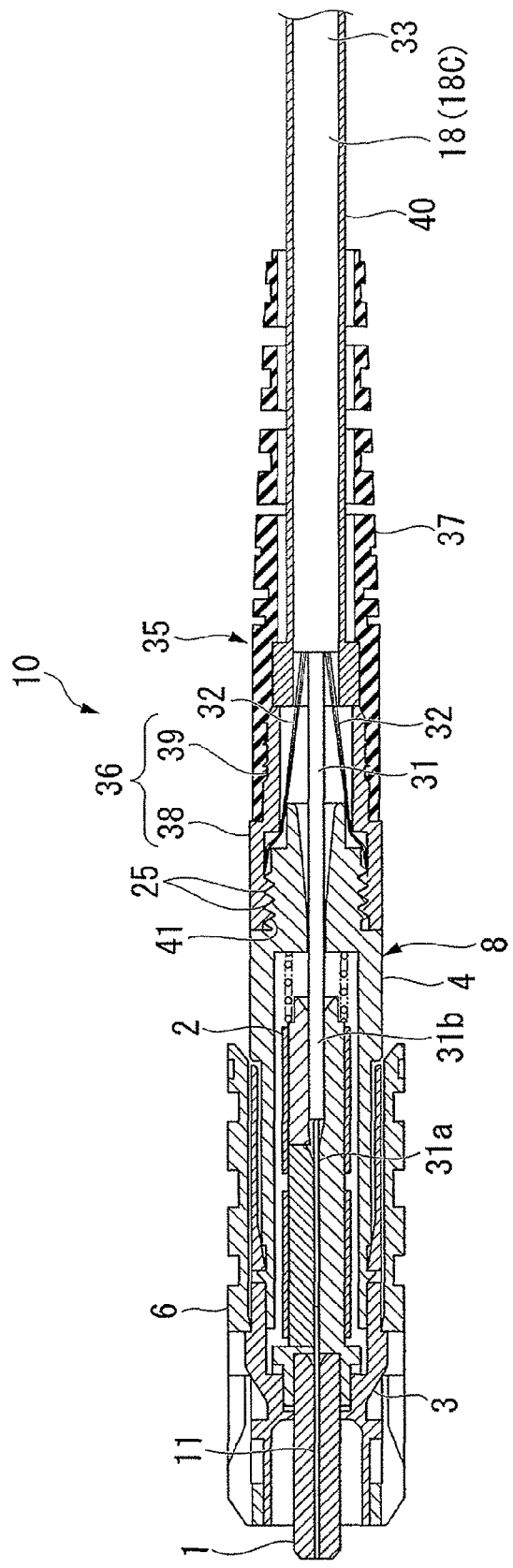
FIG. 32 is a cross-sectional view showing an example in which the optical connector is used for another optical fiber.

FIG. 32 shows the structure of the optical connector 10 to which an optical fiber cord 18C (optical fiber) with an outer diameter of 2 mm, for example, is connected.

The optical fiber cord 18C can be exemplified by one with a construction in which an optical fiber 31 such as an optical fiber core or the like, and a tensile element 32 extending in the longitudinal direction of the optical fiber 31, are housed in a sheath 33 made from a resin such as polyethylene.

For the tensile element 32, an aramid fiber is used ideally. However, glass fiber, carbon fiber, or the like can be used.

The optical fiber cord is globally used as standard. Furthermore, for the optical fiber cord, an optical fiber with an outer diameter of 0.9 mm is globally used as a standard. In the example in the figure, the optical fiber 31 housed in the optical fiber cord 18C has an outer diameter of 0.9 mm.

In this example, instead of the boot part 7, a boot part 35 is used.

The boot part 35 has a fixing cap 36 that can be fixed on the fixing part 22 of the stop ring 4, an extending part 37 which is connected to the rear end side of the fixing cap 36 and extends toward the rear, and a protective tube 40 which is inserted into the extending part 37.

The fixing cap 36 is made from a comparatively hard synthetic resin, and has a cylindrical mounting part 38 which is screwed to the fixing part 22, and a connecting sleeve part 39 which extends from the rear end of the mounting part 38 toward the rear.

A screw part 41 which is screwed to the screw part 25 of the fixing part 22 is formed in the inner surface of the mounting part 38.

The extending part 37, which is made from a comparatively flexible synthetic resin such as rubber, covers the connecting sleeve part 39, and is engaged due to its elasticity.

As shown in FIG. 32, the fixing cap 36 can fix the tensile elements 32 by sandwiching the tensile elements 32 pulled out from the end of the optical fiber cord 18C between itself and the fixing part 22 and by screwing it to the fixing part 22. That is, by fitting the screw part 41 of the mounting part 38 to the screw part 25 of the fixing part 22 in a state in which the tensile elements 32 are sandwiched, it is possible to fix the tensile elements 32 in the fixing part 22.

Next is a description of a method for assembling the optical connector 10 at the front end of the optical fiber cord 18C.

Figure 33:
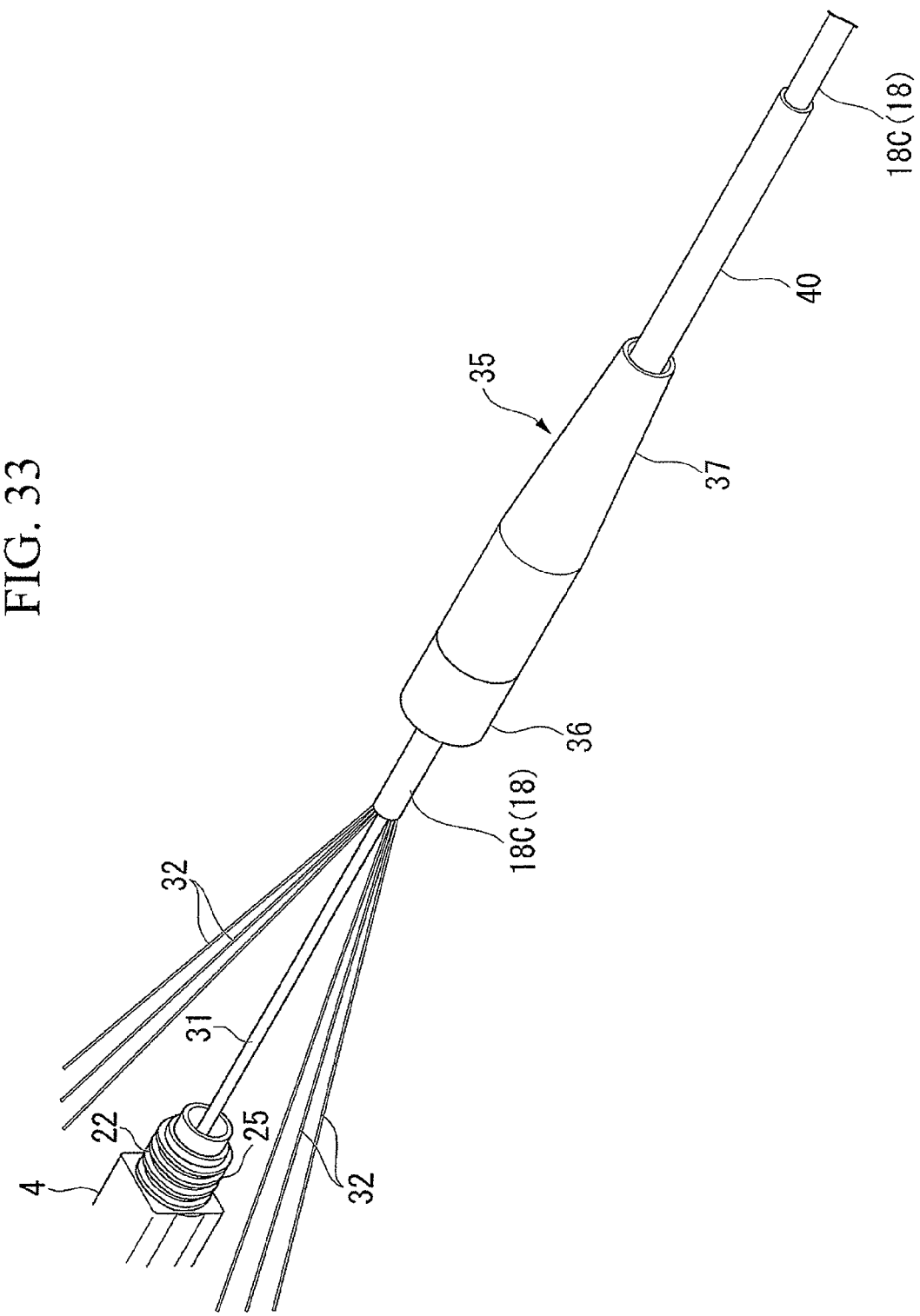
FIG. 33 is an explanatory view showing a process for assembling the optical connector.

As shown in FIG. 32 and FIG. 33, the optical fiber 31 extends from the optical fiber cord 18C and at the same time the tensile elements 32 are pulled out. Moreover, the front end part 31a (for example, a bare optical fiber) of the optical fiber 31 is extended.

The optical fiber 31 is inserted into the stop ring 4, the front end part 31a is butted and connected to the captive optical fiber 11 in the aligning part 15b, and the wedge 26 is pulled out (refer to FIG. 25). In this manner, the connection of the optical fibers 11 and 31 is maintained.

At this time, the jacket 31b of the optical fiber 31 is sandwiched and fixed between the second lid 12c and the base part 12a.

Next, as shown in FIG. 33, the fixing cap 36 is screwed to the fixing part 22 in a state in which the tensile elements 32 are divided into multiple bundles as required, and located on the outer peripheral surface of the fixing part 22. In this manner, the tensile elements 32 are sandwiched and fixed between the fixing cap 36 and the fixing part 22.

In the case where an optical fiber with a smaller diameter than the optical fiber 31 (outer diameter of 0.9 mm) is used for the optical fiber cord 18C, the spacer tube 19 covers it as described previously.

However, since a jacket of an optical fiber with a diameter of 0.25 mm is different from one used for a typical optical fiber cord, it is possible to use a different construction for the part that extends from the optical connector 10, than for the case of the optical fiber cord.

As described above, in the optical connector 10, the holding part 2 can sandwich and fix the first optical fiber 18A, and by interposing the spacer tube 19, it is possible to sandwich and fix the second optical fiber 18B with a smaller diameter than the first optical fiber 18A.

Furthermore, by using a spacer tube having an inner diameter corresponding to the outer diameter of the optical fiber, an optical fiber with an arbitrary diameter can be fixed.

Accordingly, it can be used for a plurality of types of optical fibers with different diameters.

Figure 34:
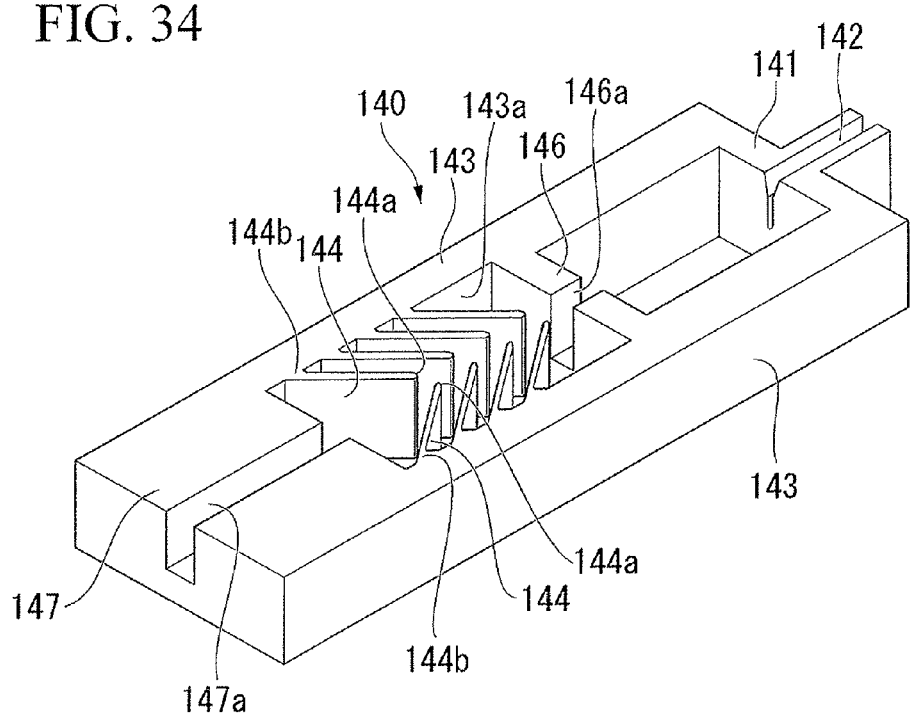
FIG. 34 is a perspective view of another example of an optical fiber holder.
Figure 35:
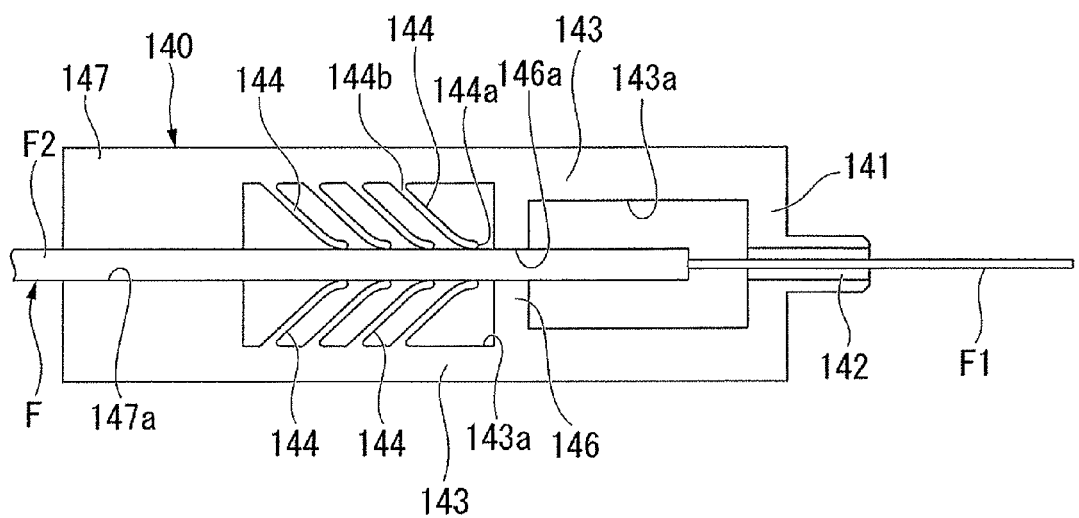
FIG. 35 is a plan view of the other example of an optical fiber holder.

FIG. 34 and FIG. 35 show another embodiment of an optical fiber holder. This optical fiber holder 140 is described in detail in Japanese Patent Application No. 2004-373227 (Title of the Invention: Optical Fiber Holder and Method of Processing Optical Fiber Cable).

As shown in FIG. 34, the optical fiber holder 140 comprises a front end wall 141 in which an optical fiber groove 142 is formed, into which the inserted optical fiber F is inserted, a pair of side walls 143, which extend rearward from the two end parts of the front end wall 141, and leaf shaped spring pieces 144, which protrude from the inside faces 143a of the side walls 143.

The spring pieces 144 are inclined forward. That is, the edge parts 144a on the front end side are located forward of the root parts 144b. The spring pieces 144 are all inclined in the same direction. The spring pieces 144 provided on the two side walls 143 are symmetrical to each other (vertically symmetrical in FIG. 35). The optical fiber holder 140 is formed in one piece using synthetic resin.

As shown in FIG. 35, the optical fiber holder 140 can sandwich the inserted optical fiber F between the spring pieces 144 formed on one side wall 143 and the spring pieces 144 formed on the other side wall 143. At this time, the spring pieces 144 are bent and deformed resiliently, and hold the inserted optical fiber F by the strength of their restoring forces.

That is, since the spaces between the end parts of the pairs of spring pieces 144 are smaller than the thickness of the inserted optical fiber F, the front ends of the spring pieces 144 are bent, and grip the inserted optical fiber F by the strength of their restoring forces.

Since the spring pieces 144 are inclined, it is easy to move the inserted optical fiber F forward when held such that it is gripped between the spring pieces 144. That is, only just pressed lightly, the inserted optical fiber F slides between the spring pieces 144.

Furthermore, the resistance at the time of backward movement becomes great. That is, it is difficult to move the inserted optical fiber F due to the friction between the spring pieces 144.

Connecting walls 146 and 147, which connect the side walls 143, are provided in front and in back of the region where the spring pieces 144 protrude from the pair of side walls 143. The notch grooves 146a and 147a into which the inserted optical fiber F is inserted are formed in the connecting walls 146 and 147.

The primary purpose of the embodiments of the present invention is to realize excellent connection characteristics by aligning the bevel directions of the front end faces of optical fibers.

It is well known that there are cases in which a front end face cut by an optical fiber cutter (bevel processing device) is not an ideal flat surface, and has a few chips formed in it. Moreover, even if the second optical fiber (other optical fiber) is pushed in toward the optical connector such that the bevel directions coincide, a certain discrepancy occurs inevitably due to discrepancies in the mechanism or the operator's skill.

Accordingly, in the embodiments of the present invention, "aligning the bevel directions" does not mean that the front end faces of the optical fibers are matched such that they align perfectly. That is, even if there is a slight discrepancy in the bevel directions, and such a gap that can be permitted in an optical design occurs between the front end faces, it can be included in the technical scope of the present invention.

What is claimed is:

1. A method of butting and connecting a first optical fiber and a second optical fiber in an optical connector, the method comprising:
    placing the optical connector that holds the first optical fiber in an optical fiber connection tool, the first optical fiber having a front end face beveled relative to a plane perpendicular to an optical fiber axis direction, the optical fiber connection tool comprising a holder support base that supports the optical connector thereon and an optical fiber holder that holds the second optical fiber therein, the holder support base having a guide part that guides the optical fiber holder in a direction approaching the optical connector;
    mounting the optical fiber holder that holds the second optical fiber therein, on a holder mounting base of an angled fiber optic cleaver;
    beveling a front end face of the second optical fiber by making a scratch on a side facing the holder mounting base of the cleaver while twisting the second optical fiber along a rotation direction of the axis;
    transferring the optical fiber holder that fixes the second optical fiber having a beveled front end face to the holder support base; and
    moving the optical fiber holder toward the optical connector along the guide part, and butting and connecting the beveled front end face of the second optical fiber to the front end face of the first optical fiber such that their bevel directions are aligned,
    wherein a bevel angle and a phase of the first optical fiber are predetermined so as to match the cleaved front end face of the second optical fiber.

2. The method according to claim 1, wherein
the optical connector is a field assembly type optical connector in which the first and second optical fibers are sandwiched between a pair of elements and connected.

3. The method according to claim 1, wherein
the optical connector is a mechanical splicing unit in which the first and second optical fibers are sandwiched between a pair of elements and connected.

4. The method according to claim 1, wherein
the optical connector sandwiches the front end faces of the first and second optical fibers between a pair of holding elements and butts them to each other;
a spacer tube covers the second optical fiber; and
the pair of holding elements clamps the second optical fiber via the spacer tube.

5. An optical fiber connection tool comprising:
    a holder support base that supports an optical connector that holds a first optical fiber therein, the first optical fiber having a front end face beveled relative to a plane perpendicular to an optical fiber axis direction;
    an optical fiber holder that holds a second optical fiber therein;
    an angled fiber optic cleaver that bevels a front end face of the second optical fiber by making a scratch on a side facing a holder mounting base while twisting the second optical fiber along a rotation direction of the axis, wherein:
    the holder support base comprises a guide part that guides the optical fiber holder in a direction approaching the optical connector;
    the optical fiber holder can be mounted on a holder mounting base of the angled fiber optic cleaver, so that the front end face of the second optical fiber can be beveled relative to a plane perpendicular to the optical fiber axis direction; and
    the optical fiber holder can be moved toward the optical connector along the guide part on the holder support base, such that the beveled front end face of the second optical fiber, can be butted and connected to a front end face of the first optical fiber such that their bevel directions are aligned.

6. A method of butting and connecting a first optical fiber and a second optical fiber in an optical connector, the method comprising:
    supporting the optical connector that holds the first optical fiber therein on a holder support base, the first optical fiber having a front end face beveled relative to a plane perpendicular to an optical fiber axis direction;
    mounting an optical fiber holder that fixes the second optical fiber thereon, on a holder mounting base of an angled fiber optic cleaver;
    beveling a front end face of the second optical fiber by making a scratch on a side facing the holder mounting base of the cleaver while twisting the second optical fiber along a rotation direction of the axis;
    transferring the optical fiber holder to the holder support base while the second optical fiber remains fixed; and
    butting and connecting the front end face of the second optical fiber to the front end face of the first optical fiber by moving the optical fiber holder toward the optical connector on the holder support base,
    wherein a bevel angle and a phase of the first optical fiber are predetermined so as to match the cleaved front end face of the second optical fiber.

7. The method according to claim 5, wherein the holder support base has a guide part that guides the optical fiber holder in a direction approaching the optical connector.

8. The method according to claim 6, wherein
the phase of the front end face of the first optical fiber relative to a reference plane of the holder support base is α1 (0°≦α1<180° while supporting the optical connector on the holder support base, and
the front end face of the second optical fiber is processed such that the front end face of the second optical fiber is beveled at the same angle as the front end face of the first optical fiber, and the phase relative to the reference plane of the optical fiber holder is α1+180° while processing the front end face of the second optical fiber.

9. The method according to claim 8, wherein
the reference plane of the holder support base is an optical fiber holder support face of the holder support base, and
the reference plane of the optical fiber holder is a bottom face of the optical fiber holder.

10. A method of butting and connecting a first optical fiber, with a front end face beveled relative to a plane perpendicular to an optical fiber axis direction, and a second optical fiber in an optical connector, the method comprising:
fixing an end portion of the second optical fiber attachably and detachably to a front end bevel processing tool;
beveling a front end face of the fixed second optical fiber relative to a plane perpendicular to an axis direction of the optical fiber using the front end bevel processing tool;
detaching the beveled second optical fiber from the front end bevel processing tool while attaching a connection jig to a portion of the second optical fiber other than a portion that is fixed by the front end bevel processing tool, such that the connection jig is orientated in a predetermined direction; and
moving the second optical fiber toward the optical connector, and butting and connecting the front end face of the second optical fiber to the front end face of the first optical fiber such that their bevel directions are aligned, while the connection jig is orientated in the predetermined direction.

11. The method according to claim 9, wherein
the connection jig can be attached and detached freely to and from the second optical fiber.

12. The method according to claim 10, wherein
the first and second optical fibers are sandwiched between a pair of holding elements in the optical connector and butt connected together.

13. The method according to claim 10, wherein
the optical connector has an optical ferrule; and
the first optical fiber is captive in the optical ferrule.

14. The connection jig used in the method of claim 10, wherein the connection jig can be attached to the second optical fiber.

15. The connection jig according to claim 14, wherein
the connection jig is not rotationally symmetrical about the axis thereof when attached to the second optical fiber.

16. The method according to claim 10, wherein
the optical connector sandwiches the front end faces of the first and second optical fibers between a pair of holding elements, and butts them to each other;
a spacer tube covers the second optical fiber; and
the pair of holding elements clamps the second optical fiber via the spacer tube.

* * * * *